US010666067B2

(12) United States Patent
Higgins et al.

(10) Patent No.: US 10,666,067 B2
(45) Date of Patent: May 26, 2020

(54) PORTABLE CHARGING UNIT WITH ACCELERATED CHARGING FOR HEARING ASSISTANCE DEVICES

(71) Applicant: Starkey Laboratories, Inc., Eden Prairie, MN (US)

(72) Inventors: Sidney A. Higgins, Maple Grove, MN (US); Christopher Young, Shorewood, MN (US); Kyle Olson, St. Louis Park, MN (US); Brantly A. Sturgeon, Burnsville, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

(21) Appl. No.: 16/012,399

(22) Filed: Jun. 19, 2018

(65) Prior Publication Data

US 2019/0386498 A1    Dec. 19, 2019

(51) Int. Cl.
*H02J 7/00* (2006.01)
*H02J 7/35* (2006.01)
*H04R 25/00* (2006.01)

(52) U.S. Cl.
CPC ............ *H02J 7/0021* (2013.01); *H02J 7/007* (2013.01); *H02J 7/355* (2013.01); *H04R 25/602* (2013.01);
(Continued)

(58) Field of Classification Search
CPC ........ H02J 7/0021; H02J 7/007; H02J 7/0052; H02J 7/355; H04R 25/602;
(Continued)

(56) References Cited

U.S. PATENT DOCUMENTS 5,610,988 A * 3/1997 Miyahara ............. H04R 25/558
381/312
6,586,940 B2 * 7/2003 Asakura .................. H02M 3/07
324/426

(Continued)

FOREIGN PATENT DOCUMENTS

WO    2014/088768    6/2014
WO    2017/084686    5/2017

OTHER PUBLICATIONS

Search Report dated Oct. 28, 2019 from EP Application No. 19180985.4, 11 pages.

*Primary Examiner* — Binh Kien Tieu
(74) *Attorney, Agent, or Firm* — Mueting, Raasch & Gebhardt, P.A.

(57) ABSTRACT

First and second hearing assistance devices each comprise a rechargeable power source and power management circuitry configured to control charging of the power sources. A portable charging unit comprises an interface configured to receive a connector of a power cable or a power and data cable, a rechargeable power source coupled to the interface, first and second charge ports configured to receive the first and second hearing assistance devices, and charging circuitry coupled to the first and second charge ports and to the rechargeable power source of the charging unit. The power management circuitry and the charging circuitry cooperate to partially charge the power sources of the hearing assistance devices at an accelerated charge rate above 1.0C when a state of charge (SoC) of the power sources is within a predetermined SoC range.

22 Claims, 13 Drawing Sheets

(52) U.S. Cl.
CPC ...... *H04R 2225/31* (2013.01); *H04R 2225/33* (2013.01)

(58) Field of Classification Search
CPC ............ H04R 2225/31; H04R 2225/33; G01R 31/3624; G01R 31/3675; H04M 10/052; H04M 10/0525; H04M 10/0583; H04M 10/0587; A61N 1/3605; A61N 1/36128; A61N 1/3787
USPC ................ 381/312, 315, 323, 328, 330, 331
See application file for complete search history.

(56) References Cited

U.S. PATENT DOCUMENTS

| | | |
|---|---|---|
| 7,324,652 B2 | 1/2008 | Preves et al. |
| 7,760,898 B2 | 7/2010 | Howell et al. |
| 8,958,590 B2 | 2/2015 | Hastrup |
| 9,107,586 B2 | 8/2015 | Tran |
| 9,237,786 B2 | 1/2016 | Kolton |
| 9,263,903 B2 | 2/2016 | Newton |
| 9,445,768 B2 | 9/2016 | Alexander et al. |
| 9,685,810 B1* | 6/2017 | Bhardwaj ............ H02J 7/0093 |
| 2007/0104343 A1* | 5/2007 | Bengtsson ........... H04R 25/305 381/323 |
| 2008/0232623 A1 | 9/2008 | Solum et al. |
| 2008/0240480 A1* | 10/2008 | Pinnell ................. H04R 25/602 381/323 |
| 2010/0253505 A1 | 10/2010 | Chou |
| 2010/0285339 A1* | 11/2010 | Chaturvedi ....... H01M 10/0525 429/61 |
| 2012/0318781 A1* | 12/2012 | Lavin, Jr. ............. A41D 13/005 219/211 |
| 2013/0096653 A1* | 4/2013 | Winstrom .......... A61N 1/36128 607/61 |
| 2013/0165993 A1* | 6/2013 | Aghassian ......... A61N 1/36125 607/59 |
| 2013/0216434 A1 | 8/2013 | Ow-Wing |
| 2015/0171470 A1* | 6/2015 | kobayashi ............ H01M 4/133 429/199 |
| 2015/0229151 A1* | 8/2015 | Sudan ................... H02J 7/0072 320/137 |
| 2016/0268633 A1* | 9/2016 | Schofield ............. H01M 4/622 |
| 2017/0064429 A1 | 3/2017 | Hirsch et al. |
| 2017/0157408 A1* | 6/2017 | Meskens ............. A61N 1/3787 |
| 2018/0014784 A1 | 1/2018 | Heeger et al. |
| 2018/0123355 A1 | 5/2018 | Olson et al. |

* cited by examiner

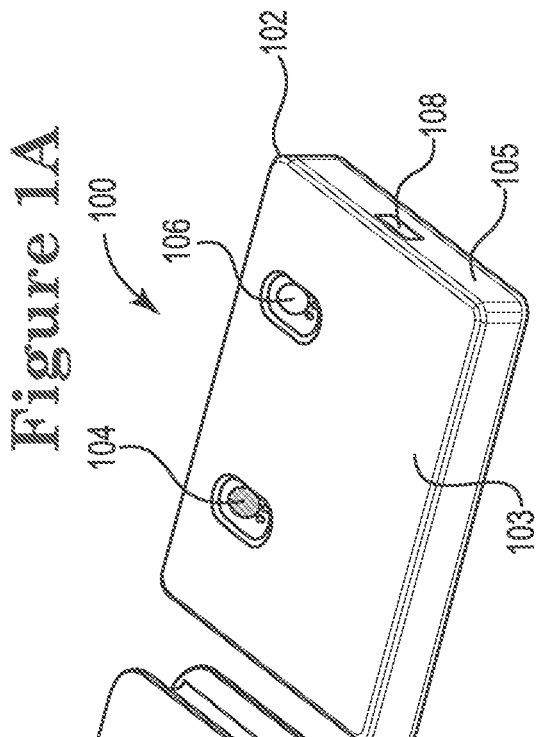
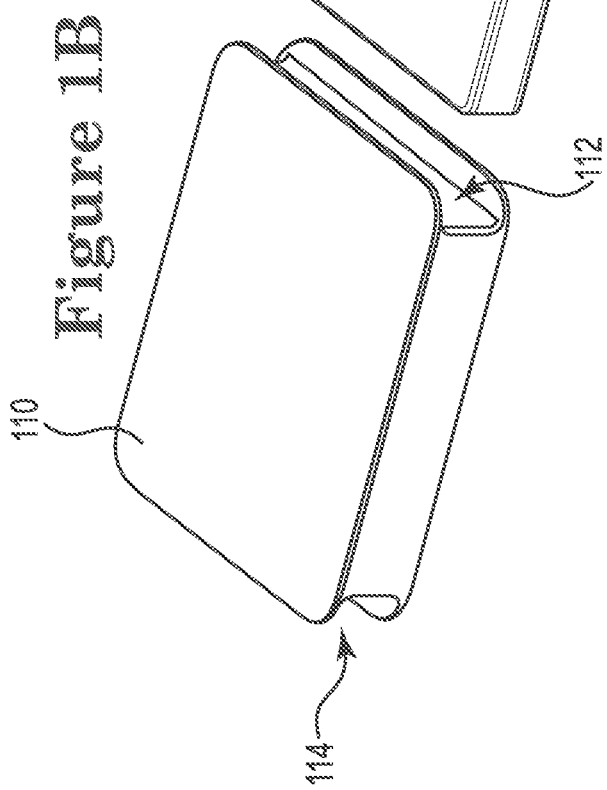
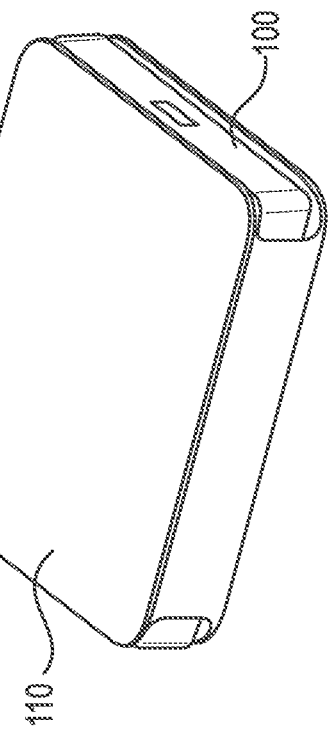

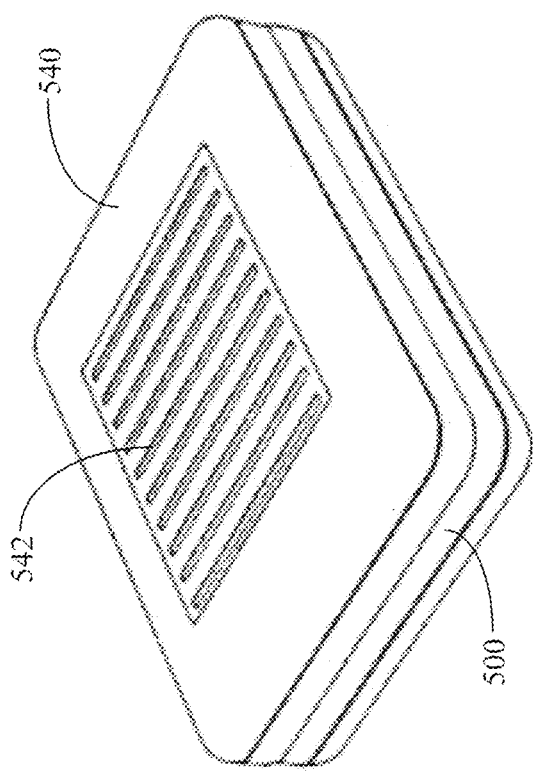
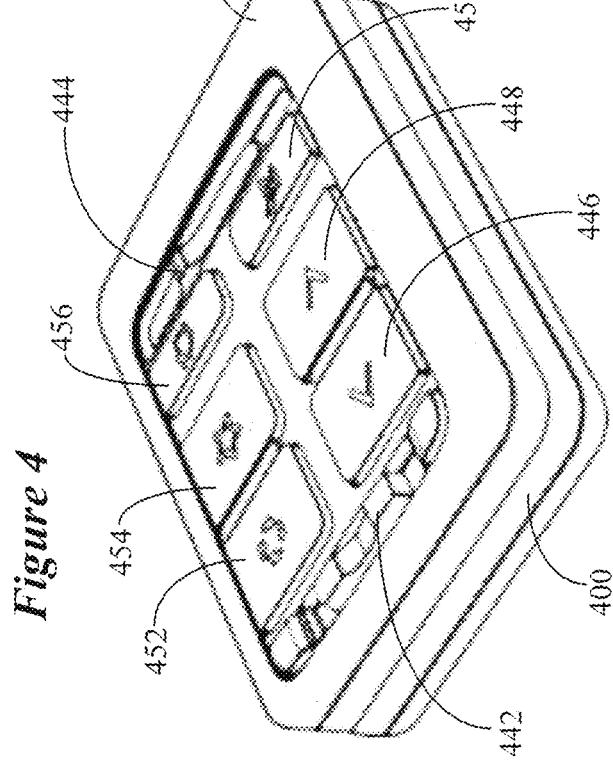

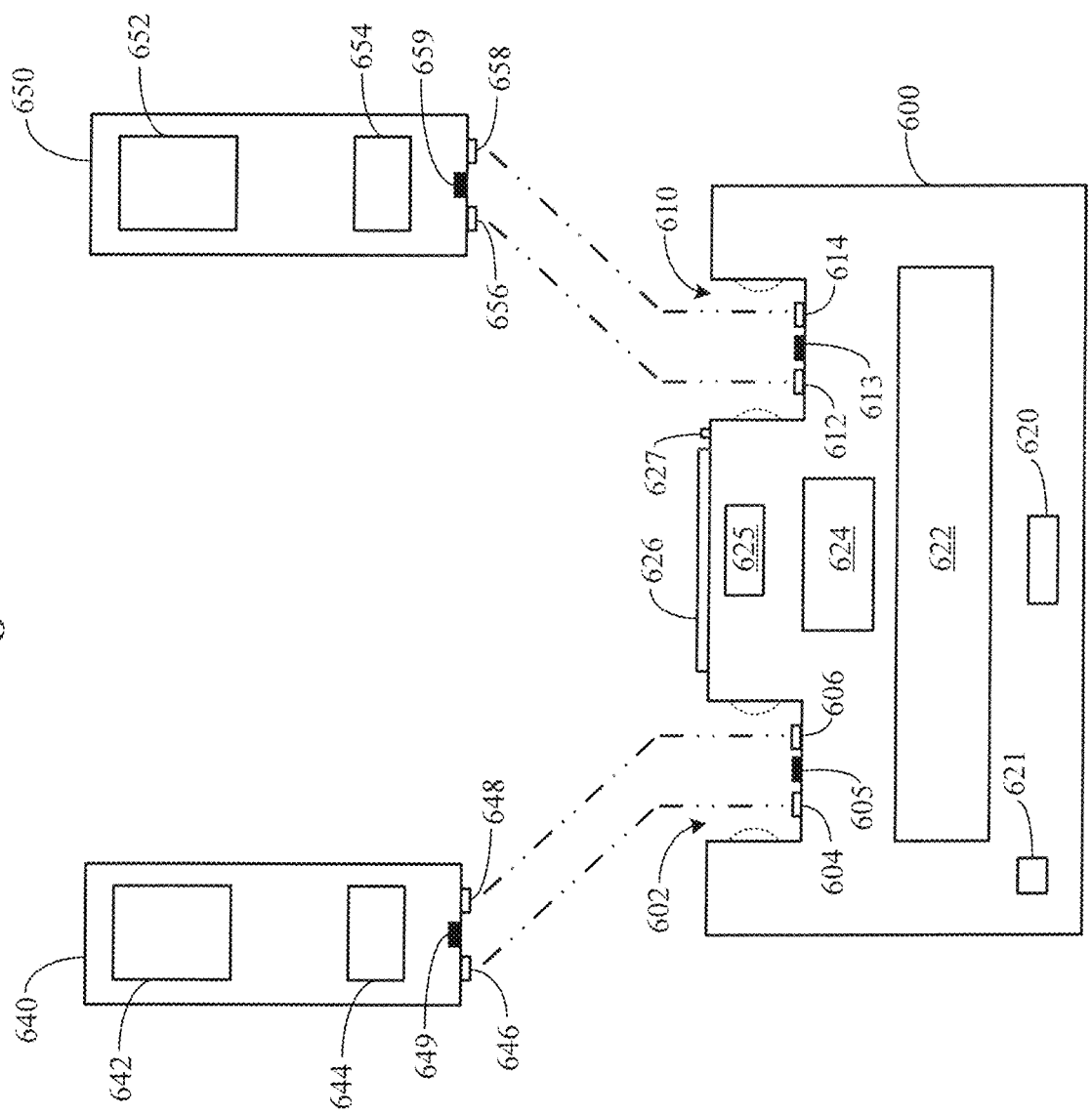
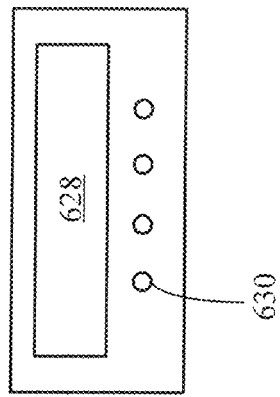

PORTABLE CHARGING UNIT WITH ACCELERATED CHARGING FOR HEARING ASSISTANCE DEVICES

TECHNICAL FIELD

This application relates generally to portable charging units for recharging hearing assistance devices, including hearing aids, personal amplification devices, and other hearables.

BACKGROUND

Hearing devices provide sound for the user. Some examples of hearing devices are headsets, hearing aids, speakers, cochlear implants, bone conduction devices, and personal listening devices. Hearing devices often include a rechargeable battery that can be recharged, but can become depleted during daily use, leaving the user without the benefit of a functioning hearing device.

SUMMARY

Various embodiments are directed to an apparatus comprising first and second hearing assistance devices each comprising a rechargeable power source and power management circuitry configured to control charging of the power sources. A portable charging unit comprises an interface configured to receive a connector of a power cable or a power and data cable, a rechargeable power source coupled to the interface, first and second charge ports configured to receive the first and second hearing assistance devices, and charging circuitry coupled to the first and second charge ports and to the rechargeable power source of the charging unit. The power management circuitry and the charging circuitry cooperate to partially charge the power sources of the hearing assistance devices at an accelerated charge rate above 1.0C when a state of charge (SoC) of the power sources is within a predetermined SoC range.

Some embodiments are directed to an apparatus including a portable charging unit comprising an interface configured to receive a connector of a power cable or a power and data cable, a rechargeable power source coupled to the interface, first and second charge ports configured to receive first and second rechargeable hearing assistance devices, and charging circuitry coupled to the first and second charge ports and to the rechargeable power source. The charging circuitry is configured to partially charge the power source at an accelerated charge rate above 1.0C when a SoC of the power source of the portable charging unit is within a predetermined SoC range.

Other embodiments are directed to an apparatus comprising first and second hearing assistance devices each comprising a rechargeable power source and power management circuitry configured to control charging of the power sources. A portable charging unit comprises an interface configured to receive a connector of a power cable or a power and data cable, a rechargeable power source coupled to the interface, first and second charge ports configured to receive the first and second hearing assistance devices, and charging circuitry coupled to the first and second charge ports and to the rechargeable power source. The power management circuitry and the charging circuitry cooperate to partially charge the power sources of the hearing assistance devices at an accelerated charge rate above 1.0C when a SoC of the power sources is within a predetermined SoC range. The charging circuitry is configured to partially charge the power source of the portable charging unit at an accelerated charge rate above 1.0C when a SoC of the power source of the portable charging unit is within a predetermined SoC range.

Various embodiments are directed to a method of charging rechargeable power sources of first and second hearing assistance devices using a portable rechargeable charging unit. The method comprises connecting the first and second hearing assistance devices (HADs) to the portable charging unit, determining a SoC of the HAD power sources, charging the HAD power sources at an accelerated charge rate above 1.0C in response to the SoC falling within a predetermined SoC range, and charging the HAD power sources at a normal charge rate at or below 1.0C in response to the SoC exceeding the predetermined SoC range.

Some embodiments are directed to a method of charging rechargeable power sources of first and second hearing assistance devices using a portable rechargeable charging unit. The method comprises determining, by the charging unit, a SoC of the power sources and whether the SoC is within a predetermined SoC range, and transmitting, in response to the SoC falling within the predetermined SoC range, an initiation signal from the charging unit to the first and second hearing assistance devices requesting that accelerated charging at an accelerated charge rate above 1.0C be initiated. The method also comprises controlling, by the first and second hearing assistance devices, charging of the power sources at the accelerated charge rate, and communicating charging data from the first and second hearing assistance devices to the charging unit during charging of the power sources. The method further comprises transmitting, in response to the SoC exceeding the predetermined SoC range, a termination signal from the charging unit to the first and second hearing assistance devices requesting that accelerated charging be terminated.

Other embodiments are directed to a method of charging a rechargeable power source of a portable charging unit comprising supplying power to the portable charging unit, determining a SoC of the power source, charging the power source at an accelerated charge rate above 1.0C in response to the SoC falling within a predetermined SoC range, and charging the power source at a normal charge rate at or below 1.0C in response to the SoC exceeding the predetermined SoC range.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein:

FIG. 1A shows a portable rechargeable charging unit in accordance with various embodiments;

FIG. 1B shows a protective sleeve for receiving and protecting a portable charging unit in accordance with various embodiments;

FIG. 1C shows a portable charging unit covered by a protective sleeve in accordance with various embodiments;

FIG. 4 illustrates an accessory device configured to physically and electrically connect with a portable charging unit in accordance with various embodiments;

FIG. 5 illustrates another accessory device configured to physically and electrically connect with a portable charging unit in accordance with various embodiments;

FIG. 6A shows a portable charging unit configured to facilitate accelerated charging of a pair of hearing assistance devices in accordance with various embodiments;

FIG. 6B shows a representative user interface of the portable charging unit shown in FIG. 6A in accordance with various embodiments;

The figures are not necessarily to scale. Like numbers used in the figures refer to like components. However, it will be understood that the use of a number to refer to a component in a given figure is not intended to limit the component in another figure labeled with the same number;

DETAILED DESCRIPTION

Figure 2A:
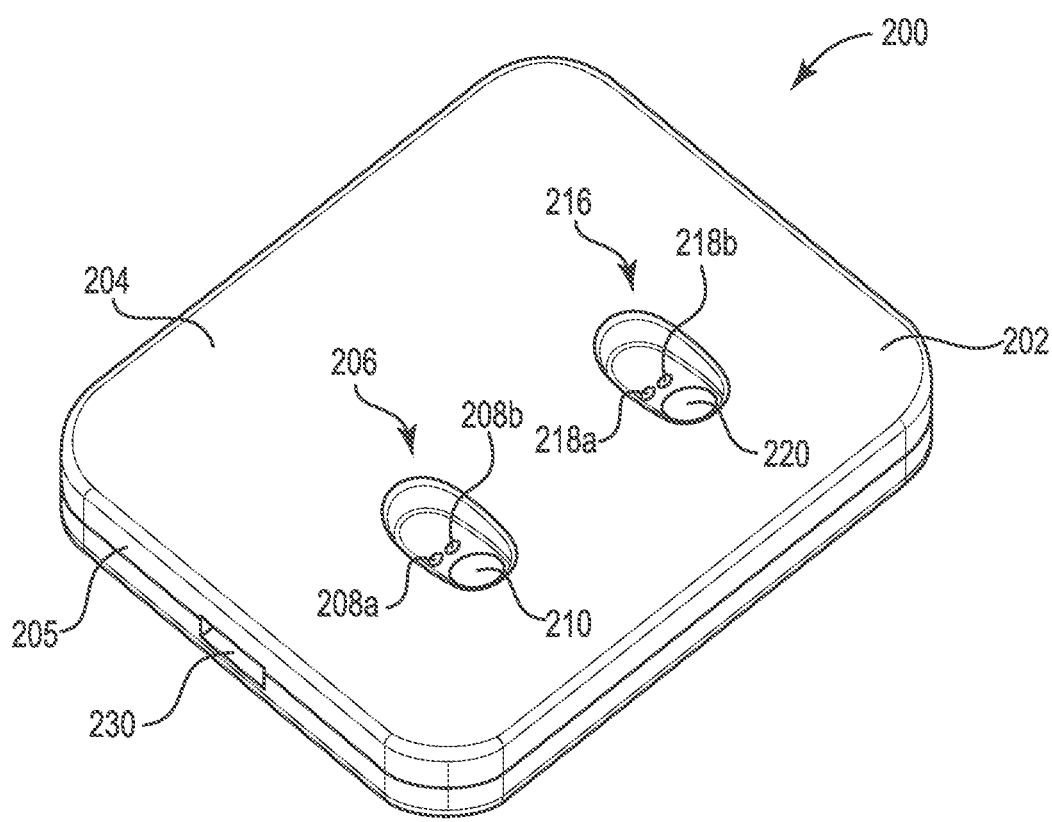
FIG. 2A shows various features of a portable charging unit in accordance with various embodiments.

A conventional approach to charging hearing assistance devices involves the use of a charging station designed to be placed on a table and plugged into a wall socket within a wearer's home. Typical charge times range between 2 and 6 hours to fully charge the hearing assistance devices using a conventional charging station. Conventional charging approaches fail to address a significant problem faced by on-the-go wearers of hearing assistance devices. During normal use of the hearing assistance devices away from the wearer's home (and charging station), the wearer may experience a "dead battery" scenario, which renders the hearing assistance devices temporarily inoperable. Although some on-the-go chargers have been developed, these require on the order of hours of recharge time. Moreover, during the charging procedure, the wearer must go without the benefit of the hearing assistance devices.

Embodiments of the disclosure are directed to a portable charging unit configured for charging one or more hearing assistance devices (HADs). The portable charging unit and the HADs are configured to implement accelerated charging of the HADs, by which rechargeable power sources of the HADs are partially charged within a very short timeframe. The term "accelerated charging" refers to charging a rechargeable power source (e.g., a battery) at an accelerated charge rate above 1.0C when the power source has a sufficiently low voltage or state of charge (SoC). Accelerated charging can be implemented to partially charge a rechargeable power source within a relatively short time frame, such that the power source has a storage capacity for several hours of use. Accelerated charging of a rechargeable power source can be implemented when the SoC of the power source is within a predetermined SoC range, such as between 5 and 45%. Because the power source is at a low voltage or low SoC, the rate at which it can be charged can be increased beyond 1.0C without the risk of damaging the power source. For example, lithium plating can occur when charging a lithium-ion battery at charge rates above 1.0C, particularly when the battery is almost fully charged. However, it is been found that charging a lithium-ion battery at an accelerated charge rate above 1.0C (e.g., from 1.5C to 3.0C) when the SoC is within 5 to 45% significantly decreases the risk of cell degradation due to lithium plating.

For example, after about 5 minutes of accelerated charging, a pair of HADs have sufficient charge for between 2 and 6 hours of use. According to some embodiments, the pair of HADs can be used by the wearer during a charging procedure, which can include accelerated charging. The portable charging unit includes a rechargeable power source that can be recharged using accelerated charging in accordance with embodiments of the disclosure. For example, after about 7 minutes of accelerated charging, the portable charging unit has enough capacity to supply a full charge to the pair of HADs and, in addition, perform accelerated charging of the HADs.

It is understood that the embodiments described herein may be used with any hearing assistance device without departing from the scope of this disclosure. The devices depicted in the figures are intended to demonstrate the subject matter, but not in a limited, exhaustive, or exclusive sense. Hearing assistance devices, such as hearables (e.g., wearable earphones, ear monitors, and earbuds) and hearing aids, typically include an enclosure, such as a housing or shell, within which internal components are disposed. Typical components of a hearing assistance device can include a digital signal processor (DSP), memory, power management circuitry, one or more communication devices (e.g., a near-field communication device, a long-range communication device), one or more antennas, one or more microphones, and a receiver/speaker, for example. Near-field magnetic induction communication circuitry can be implemented to facilitate communication between a left ear device and a right ear device. Hearing assistance devices can also incorporate a long-range communication device, such as a Bluetooth® transceiver or other type of radio frequency (RF) transceiver (e.g. a 2.4 GHz radio). The transceiver can conform to an IEEE 802.11 (e.g., WiFi®) or Bluetooth® (e.g., BLE, Bluetooth® 4.2 or 5.0) specification, for example. It is understood that hearing devices of the present disclosure can employ other radios, such as a 900 MHz radio.

Hearing assistance devices of the present disclosure can be configured to receive streaming audio (e.g., digital audio data or files) from an electronic or digital source. Representative electronic/digital sources (e.g., accessory devices) include an assistive listening system, a TV streamer, a radio, a smartphone, a laptop, a cell phone/entertainment device (CPED) or other electronic device that serves as a source of digital audio data or other types of data files. Hearing assistance devices of the present disclosure can be configured to effect bi-directional communication (e.g., wireless communication) of data with an external source, such as a remote server via the Internet or other communication infrastructure.

The term hearing assistance device of the present disclosure refers to a wide variety of ear-level electronic devices that can aid a person with impaired hearing. The term hearing assistance device also refers to a wide variety of devices that can produce optimized or processed sound for persons with normal hearing. Hearing assistance devices of the present disclosure include hearables (e.g., wearable earphones, headphones, earbuds, virtual reality headsets), hearing aids (e.g., hearing instruments), cochlear implants, and bone-conduction devices, for example. Hearing assistance devices include, but are not limited to, behind-the-ear (BTE), in-the-ear (ITE), in-the-canal (ITC), invisible-in-canal (IIC), receiver-in-canal (RIC), receiver-in-the-ear (RITE) or completely-in-the-canal (CIC) type hearing devices or some combination of the above. Throughout this disclosure, reference is made to a "hearing assistance device," which is understood to refer to a system comprising one of a left ear device and a right ear device or a combination of a left ear device and a right ear device.

FIG. 1A shows a portable charging unit 100 in accordance with various embodiments. The portable charging unit 100 includes a housing 102 within which various components, including a rechargeable power source and charging circuitry, are disposed. The housing 102 includes a working surface 103 comprising a first charge port 104 and a second charge port 106. Each of the charge ports 104, 106 is configured to receive, and establish electrical connection with, a hearing assistance device. The portable charging unit 100 includes an interface 108 provided on a side surface 105 of the housing 102. The interface 108 is configured to receive a connector of a power cable or a power and data cable. For example, the interface 108 can be configured to mechanically and electrically connect to a USB cable (e.g., micro B, OTG) or a Lightning cable. Various types of data can be communicated between the portable charging unit 100, hearing assistance devices, and an external system (e.g., laptop, PC, tablet, smartphone) via the interface 100, such as charging status, maintenance messages, device use/ user statistics, and audio to or from the unit 100, the hearing assistance device, or a hearing assistance accessory. Although not shown in the embodiment of FIG. 1A, the working surface 103 of the housing 102 can support a user interface, such as a display (e.g., LED, LCD, OLED, E-ink) and/or one or more LEDs.

The housing 102 of the portable charging unit 100 is dimensioned for portability, such that it can be carried in a pocket of apparel or in a small handbag. The housing 102 can be formed from a plastic material and have a length ranging from about 1.75 inches to 3 inches, a width ranging from about 1.25 inches to 2.75 inches, and a depth ranging from about ⅛ inches to 1 inch. For example, the housing 102 can have a length of 2.25 inches, a width of 2 inches, and a depth of ⅜ of an inch. The charge ports 104, 106 define recessed regions of the working surface 103. Each of the charge ports 104, 106 includes electrical contacts for establishing electrical connection with a hearing assistance device, and further includes a retention arrangement configured to retain the hearing assistance devices within the charge ports 104, 106. The retention arrangement can be a mechanical arrangement (e.g., a spring mechanism or interference fit arrangement) or a magnetic arrangement, for example.

FIG. 1B shows a protective sleeve 110 having open sides 112 and 114 for receiving the portable charging unit 100. The protective sleeve 110 is typically formed from a plastic material. To protect the working surface 103 (e.g., the electrical contacts of the charge ports 104, 106 during transport), the portable charging unit 100 can be slid into the protective sleeve 110 via one of the open sides 112, 114. FIG. 1C shows the portable charging unit 100 covered by the protective sleeve 110. The protective sleeve 110 can also serve as a base for the portable charging unit 100, which elevates the charging unit 100 relative to the surface upon which the protective sleeve 110 is placed. This arrangement is particularly useful for hearing assistance devices that include a small wire running around the ear and into the ear canal which connects to a receiver or speaker (e.g., a receiver-in-canal hearing aid, as shown in FIG. 2B). Stacking the portable charging unit 100 on top of the protective sleeve 110 allows the wire and receiver to drape over the side of the portable charging unit 100, ensuring good retention of the hearing assistance devices within the charge ports 104, 106.

Figure 2B:
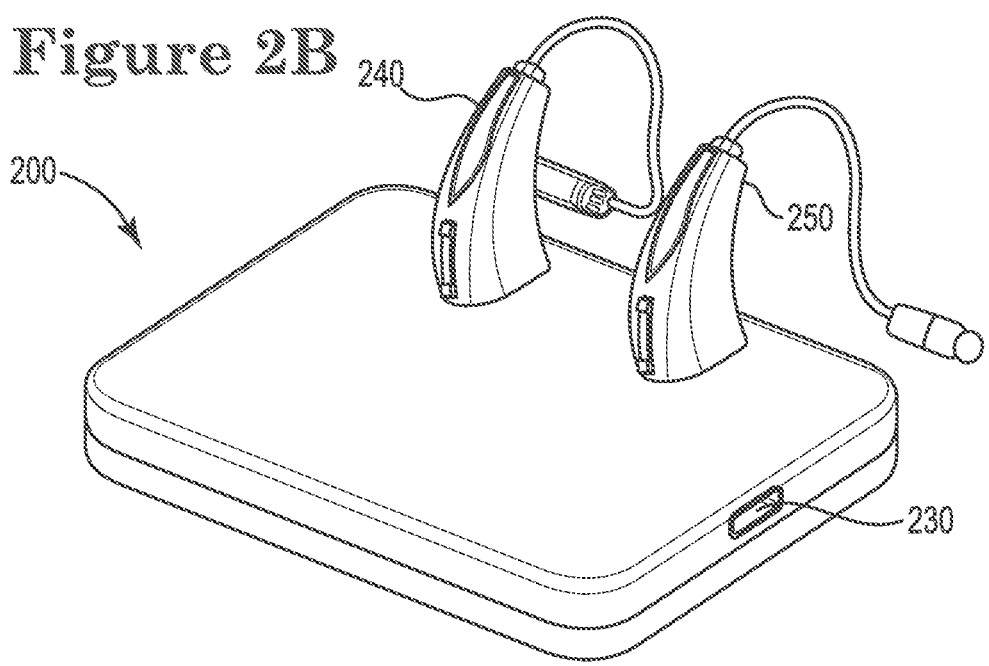
FIG. 2B shows a pair of hearing assistance devices installed in respective charge ports of a portable charging unit in accordance with various embodiments.

FIGS. 2A and 2B show various features of a portable charging unit 200 in accordance with various embodiments. In particular, the working surface 204 of the housing 202 includes a first charge port 206 configured to receive a first hearing assistance device 240 and a second charge port 216 configured to receive a second hearing assistance device 250. The first charge port 206 defines a recessed region of the working surface 204 having a shape that corresponds to a shape of the distal end of the first hearing assistance device 240. The second charge port 216 defines a recessed region of the working surface 204 having a shape that corresponds to a shape of the distal end of the second hearing assistance device 250. The first charge port 206 includes a first electrical contact 208a and a second electrical contact 208b, which are configured to connect with corresponding electrical contacts disposed on the distal end of the first hearing assistance device 240. The second charge port includes an electrical contact 218a and a second electrical contact 218b, which are configured to connect with corresponding electrical contacts disposed on the distal end of the second hearing assistance device 250. Each of the first and second charge ports 206, 216 includes a retention arrangement comprising a magnet 210, 220. The magnets 210, 220 interact magnetically with a corresponding magnet or ferrous material (e.g., ferrous material of a battery) disposed within the distal end of the first and second hearing assistance devices 240, 250. The magnets 210, 220 serve to mechanically retain the first and second hearing assistance devices 240, 250 within the first and second charge ports 206, 216 during a charging procedure.

Figure 3B:
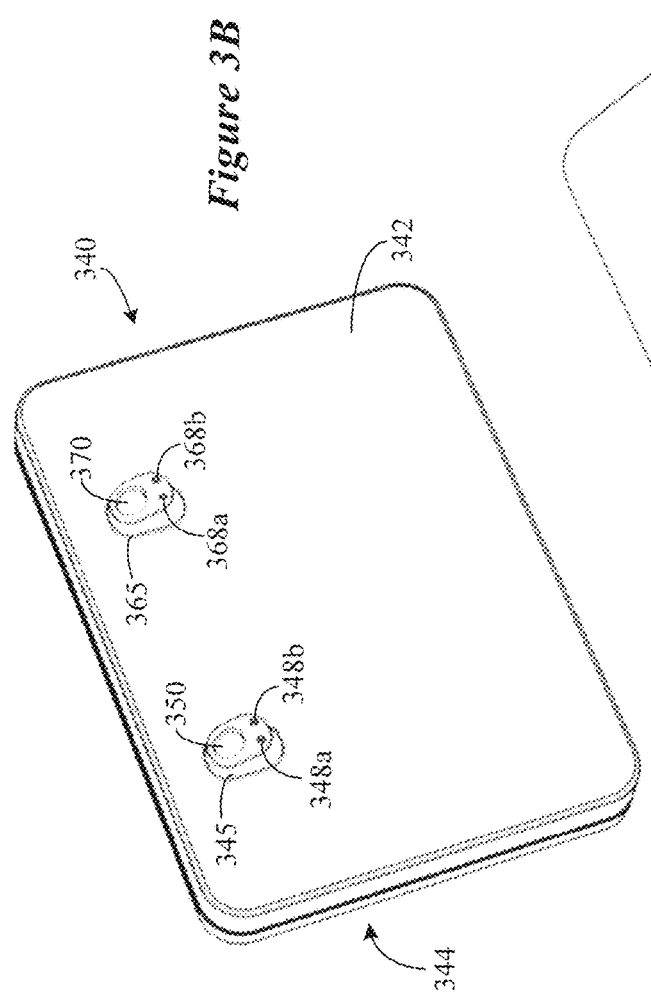
FIGS. 3A and 3B show a portable charging unit configured to connect with one of a number of different accessory devices in accordance with various embodiments.
Figure 3A:
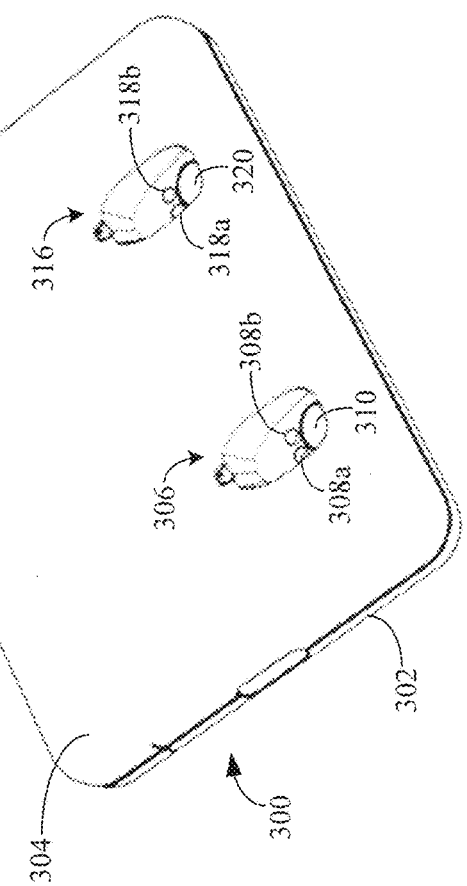

According to various embodiments, and as shown in FIGS. 3A and 3B, a portable charging unit 300 can be configured to connect with a number of different accessory devices. FIG. 3B shows a representative accessory device 340 which includes a contacting surface 342 and an opposing working surface 344 (not shown). As shown, the accessory device 340 has a length and width corresponding to that of the portable charging unit 300, although this is not required. In this regard, the accessory device 340 and the portable charging unit 300 are stackable. The contacting surface 342 of the accessory device 340 includes first and second connectors 345, 365 that protrude from the contacting surface 342. The first and second connectors 345, 365 have a shape that corresponds to a shape of the first and second charge ports 306, 316. The first and second connectors 345, 365 have a height that corresponds to a depth of the first and second charge ports 306, 316.

As is shown in FIG. 3A, the first charge port 306 includes a first electrical contact 308a, a second electrical contact 308b, and a magnet 310. The second charge port 316 includes a first electrical contact 318a, a second electrical contact 318b, and a magnet 320. As is shown in FIG. 3B, the first connector 345 includes a first electrical contact 348a, a second electrical contact 348b, and a magnet 350 (or ferromagnetic material such as iron). The second connector 365 includes a first electrical contact 368a, a second electrical contact 368b, and a magnet 370 (or ferromagnetic material such as iron). When the first and second connectors 345, 365 of the accessory device 340 are inserted into the charge ports 306, 316 of the portable charging unit 300, the contacting surface 342 of the accessory device 340 matingly engages the working surface 304 of the portable charging unit 300. In this configuration, the electrical contacts 348a, 348b, 368a, 368b of the accessory device 340 electrically connect with the electrical contacts 308a, 308b, 318a, 318b of the portable charging unit 300. Mating engagement between the portable charging unit 300 and the accessory device 342 is maintained by a magnetic attraction force generated by magnet pairs 310, 350 and 320, 370. The magnetic attraction force can be defeated by manually separating the accessory device 342 and the portable charging unit 300.

FIG. 4 illustrates an accessory device 440 configured to physically and electrically connect with a portable charging unit 400 in accordance with various embodiments. In this illustrative embodiment, the accessory device 440 is a remote control unit configured to communicate with, and control various functions of, a pair of hearing assistance devices. When connected to the portable charging unit 400 (e.g., in the manner illustrated in FIGS. 3A-3B), the remote control unit 440 draws power from the rechargeable power source of the portable charging unit 400. A slider 442 allows the user to turn the remote control unit 440 off and on. A slider 444 allows the user to select between a first (e.g., left) hearing assistance device and a second (e.g., right) hearing assistance device. The volume of the first and second hearing assistance devices can be adjusted using a volume increase button 446 and a volume decrease button 448. A mute button 450 is also provided for muting the first and second hearing assistance devices. The remote control unit 440 also includes a program selection button 452, a favorite button 454 for selecting a favorite memory or other feature or configuration, and a home button 456, which can enables a favorite mode of operation. It is understood that the functions described above represent non-exhaustive examples of functions that can be performed using the remote control unit 400. The remote control unit 400 can be less or more complex. For example, the remote control unit 400 can have only three buttons: a volume increase button, a volume decrease button, and a memory button.

FIG. 5 illustrates an accessory device 540 configured to physically and electrically connect to a portable charging unit 500 in accordance with various embodiments. In this illustrative embodiment, the accessory device 540 is a solar power accessory which includes a solar cell 542. The solar power accessory 540, when connected to the portable charging unit 500 and exposed to light, generates a charging current that recharges the rechargeable power source of the portable charging unit 500.

In accordance with other embodiments, an accessory device as shown in FIGS. 3B-5 can include one or more physiologic sensors. For example, the accessory device 340 shown in FIG. 3B can include an EKG or ECG sensor, a pulse oximeter, a respiration sensor, a temperature sensor, a glucose sensor, an EEG sensor, an EMG sensor, an EOG sensor, or a galvanic skin response sensor. Representative examples of such sensors that can be implemented in the accessory devices shown in FIGS. 3B-5 are disclosed in US Pat. Pub. Nos. 2018/0014784 (Heeger et al.), 2013/0216434 (Ow-Wing), and 2010/0253505 (Chou), and in U.S. Pat. No. 9,445,768 (Alexander et al.) and U.S. Pat. No. 9,107,586 (Bao), each of which is incorporated herein by reference in its entirety.

FIG. 6A shows a portable charging unit 600 configured to facilitate accelerated charging of a pair of hearing assistance devices 640, 650 in accordance with various embodiments. The portable charging unit 600 includes recessed first and second charge ports 602, 610 configured to receive first and second hearing assistance devices 640, 650. When inserted into the first charge port 602, the first and second electrical contacts 646, 648 of the first hearing assistance device 640 connect with the first and second electrical contacts 604, 606 of the first charge port 602. When inserted into the second charge port 610, the first and second electrical contacts 656, 658 of the second hearing assistance device 650 connect with the first and second electrical contacts 612, 614 of the second charge port 610. The first hearing assistance device 640 is retained within the first charge port 602 by a magnetic attraction force generated by magnet 605 and magnet/magnetic material 649. The second hearing assistance device 650 is retained within the second charge port 610 by a magnetic attraction force generated by magnet 613 and magnet/magnetic material 659. In an alternative embodiment, the magnets 605, 613 can be replaced by first and second spring-like electrical contacts mounted on sidewalls of the first and second charge ports 602, 610 (shown in dotted lines). The spring-like electrical contacts generate a spring force that retains the first and second hearing assistance devices 640, 650 within the first and second charge port 602, 610. In such an embodiment, the first and second electrical contacts 646, 648, 656, 658 are disposed on a distal sidewall surface of the first and second hearing assistance devices 640, 650.

The portable charging unit 600 includes an interface 620 configured to receive a connector of a power cable or a combined power/data cable (e.g., USD or Lightning cable). The portable charging unit 600 also includes a rechargeable power source 622, such as a lithium-ion battery, and charging circuitry 624. The charging circuitry 624 is coupled to the rechargeable power source 622 and the first and second charge ports 602, 610. The rechargeable power source 622 can have a capacity ranging between about 100 to 1000 mAh (e.g., 580 mAh). In general, for lithium-ion type batteries, the rechargeable power source 622 can be oversized by a factor of about 5 relative to the energy required to fully charge the first and second hearing assistance devices 640, 650 from fully dead for the life of the devices. It is understood that the rechargeable power source 622 need not be a lithium-ion battery. For example, the rechargeable power source 622 can be a high power density type such as thin film Li-ion, Li-titanate, Li-titanate supercapacitor hybrid, or other type of supercapacitor. These high power cells do not need to be oversized.

The first hearing assistance device 640 includes a rechargeable power source 642 coupled to power management circuitry 644. The second hearing assistance device 650 includes a rechargeable power source 652 coupled to power management circuitry 654. The power sources 642, 652 can be Li-ion batteries having a capacity ranging between about 15 and 25 mAh (e.g., 17.5 mAh). In some embodiments, the power sources 642, 652 can have a capacity of up to 100 mAh (e.g., for larger hearables). It is understood that the power sources 642, 652 can alternatively be of a high power density type as described hereinabove. The power management circuitry 644, 654 is configured to communicate with the charging circuitry 624 of the portable charging unit 602 to control charging of the respective power sources 642, 652. As will be described in greater detail hereinbelow, the power management circuitry 644, 654 and charging circuitry 624 cooperate to partially charge the power sources 642, 652 of the hearing assistance devices 640, 650 at an accelerated charge rate above 1.0C (e.g., 1.5C-3.0C) when a state of charge (SoC) of the power sources 642, 652 is within a predetermined SoC range (or a predetermined voltage range, e.g., 3.0-4.1 V). For example, the predetermined SoC range is a range from a fully discharged state to about 45% (e.g., 5%-45%, such as 10%-35%). Charging at the accelerated charge rate is terminated in response to one or more of reaching a predetermined time limit (e.g., 15 minutes), a predetermined voltage limit (e.g., 4.1V), or reaching a predetermined energy limit (e.g., 7.5 mAh out of a possible 17.5 mAh). After about 5 minutes of accelerated charging, for example, the power sources 642, 652 of the first and second hearing assistance devices 640, 650 have a capacity sufficient for about 2 to 6 hours of normal operation.

When the SoC of the power sources 642, 652 is outside of the predetermined SoC range, the power management circuitry 644, 654 and charging circuitry 624 cooperate to charge the power sources 642, 652 of the hearing assistance devices 640, 650 at a normal charge rate at or below 1.0C, such as at 0.3C (e.g., when it is desired to fully charge the power sources 642, 652). It is noted that the charging current associated with the accelerated charge rate is typically greater than a charging current associated with the normal charge rate by a factor of about 3 to 10. For example, the charging current associated with the normal charge rate can be about 5 mA (e.g., at 0.3C), whereas the charging current associated with the accelerated charge rate can be between 17 and 24 mA (e.g., at 1.5C).

The portable charging unit 600 shown in FIG. 6A also includes a user interface 626. In some embodiments, and with reference to FIG. 6B, the user interface 626 can include a display 628, such as an LED or OLED display. In addition, or alternatively, the user interface 626 can include one or more LEDs 630 (e.g., four LEDs). The LEDs 630 can be controlled to communicate various types of information to the user. For example, solid red on an LED near the first hearing assistance device 640 can indicate a charging error for the first hearing assistance device 640. Solid red on an LED near the second hearing assistance device 650 can indicate a charging error for the second hearing assistance device 650. A pulsing green on an LED near the first hearing assistance device 640 can indicate charging of the first hearing assistance device 640. A pulsing green on an LED near the second hearing assistance device 650 can indicate charging of the second hearing assistance device 650. Accelerated charging of each of the first and second hearing assistance devices 640, 650 can be indicated by a flashing green LED, a green LED bouncing back and forth (knight rider, similar to a line marquee), or a fast pulsing green LED. A solid green LED near each of the first and second hearing assistance devices 640, 650 can indicate that charging is complete. Normal rate charging of the portable charging unit 600 may be indicated, for example, by using all four LEDs 630 to indicate 25, 50, 75, and 100% SOC. One LED is lit per quarter SOC attained during charging. The remaining LEDs 630 may pulse at a given rate. To indicate accelerated charging of the portable charging unit 600, the LEDs 630 may pulse at a faster rate.

The user interface 626 can also include an accelerometer 625 configured to be responsive to taps applied to the housing of the portable charge unit 600. The number and/or sequence of taps as detected by the accelerometer 625 can correspond to various inputs communicated by the user. Single, double, and triple taps, for example, can correspond to three different input commands received from the user. For example, a single tap can correspond to a command that turns the user interface 626 ON/OFF. A double tap can correspond to a command that causes cycling through user interface status indicators (e.g., on-board battery status, individual hearing assistance device battery status). A triple tap can correspond to a command to start/stop accelerated charging of the first and second hearing assistance devices 640, 650. In some embodiments, accelerated charging is initiated automatically by the charging circuitry 624 and power management circuitry 642, 652. In other embodiments, accelerated charging can be initiated in response to a tap or tap sequence (e.g., a triple tap) detected by the accelerometer 625.

By way of further example, a single tap can correspond to a command to illuminate one or more LEDs to indicate onboard battery status of the portable charging unit 600. A double tap can correspond to a command to turn off the LED(s). Alternatively, and assuming no hearing assistance devices 640, 650 are attached to the portable charging unit 600, a double tap can correspond to a command to illuminate one or more LEDs to indicate onboard battery status of the portable charging unit 600 followed by a command to turn off the LED(s). If one or both hearing assistance devices 640, 650 are attached to the portable charging unit 600, a double tap can correspond to a command to illuminate one or more LEDs to indicate battery status of the hearing assistance devices 640, 605, followed by a command to turn off the LED(s). A triple tap can correspond to a command that places the portable charging unit 600 in a low power standby mode in order to conserve the stored charge over a long period of time.

The accelerometer 625 may also be configured to detect shaking of the portable charging unit 600 as a method of user input. Shaking the portable charging unit 600 in an up and down, left or right, or in and out motion may be interchanged with any single, double, or triple tap mechanism as a method of user input as described in previous examples. In some embodiments, the portable charging unit 600 employs the accelerometer 625 to detect a linear motion along one axis in three-dimensional space. This linear motion is considered to be an acceptable shaking motion when one of the following conditions is satisfied in a given time period: velocity or acceleration along a linear axis exceeds a magnitude and alternates in direction on the linear axis, variance of acceleration samples exceeds a minimum value. For example, the accelerometer 625 can be configured to detect a shaking motion for an up and down axis or a left and right axis. The accelerometer 625 can be configured to detect a motion measuring a linear acceleration of more than 1 m/s$^2$ upwards and then 1 m/s$^2$ downwards in 0.5 second intervals. A detected shake can correspond to a command that places the portable charging unit 600 in a low power standby mode in order to conserve the stored charge over a long period of time.

The accelerometer 625 may also be configured to detect a fall of the portable charging unit 600 and a subsequent impact or an impact alone as a method of user input for the purpose of detecting an impact to the portable charging unit 600 exceeding design specification. To detect a fall, the portable charging unit 600 is configured to measure a linear motion of about 9.8 m/s$^2$ for a minimum period of time. To detect an impact, the accelerometer 625 can be configured to detect a change in linear acceleration exceeding a specified amount. A detected fall and subsequent impact event, or a detected impact event alone, can be recorded in non-volatile memory (e.g., of microcontroller 1020 in FIG. 10) of the portable charging unit 600 and counted as an event. The number of falls and impact events, or impact only events, can be retrieved from non-volatile memory using the programming interface of the microcontroller.

Figure 7A:
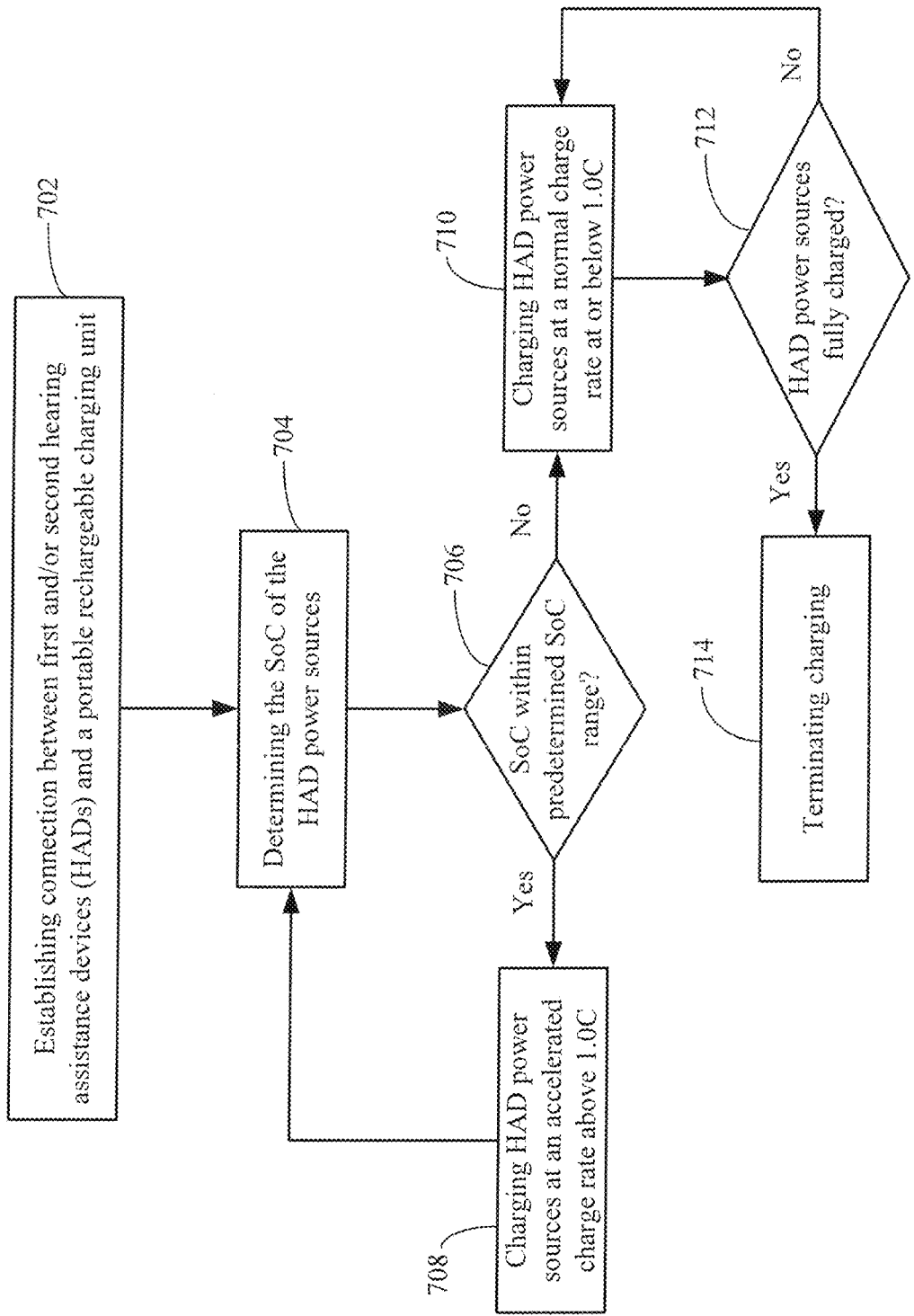
FIG. 7A illustrates a method of implementing accelerated charging of one or a pair of hearing assistance devices in accordance with various embodiments.

FIG. 7A illustrates a method of implementing accelerated charging of one or a pair of hearing assistance devices in accordance with various embodiments. The method shown in FIG. 7A involves establishing connection 702 between first and/or second hearing assistance devices and a portable rechargeable charging unit. The method involves determining 704 the SoC of the HAD power sources. A check 706 is made to determine if the SoC of the HAD power sources is within a predetermined SoC range (e.g., 5-35%). If the SoC of the HAD power sources fall within the predetermined SoC range, the method involves charging 708 the HAD power sources at an accelerated charge rate above 1.0C (e.g., 1.5C-3.0C). Accelerated charging continues while the SoC of the HAD power sources remain within the predetermined SoC range. Accelerated charging is discontinued when the SoC of the HAD power sources is beyond the predetermined SoC range. In some embodiments, accelerated charging is discontinued in response to expiration of a predetermined time limit (e.g., 15 minutes), reaching a predetermined voltage limit (e.g., 4.1V), or reaching a predetermined energy limit (e.g., 7.5 mAh).

At the termination of accelerated charging, the user may remove the hearing assistance devices from the portable charging unit and immediately use the devices. As was discussed previously, five minutes of accelerated charging allows the hearing assistance devices to be used for between 2 and 6 hours of normal operation. Rather than using the hearing assistance devices after termination of accelerated charging, the method can involve charging 710 the HAD power sources at a normal charge rate at or below 1.0 C. A check 712 is made to determine if the HAD power sources are fully charged. If not, charging at the normal charge rate continues. When the HAD power sources are fully charged, the charging procedure is terminated 714.

Figure 7B:
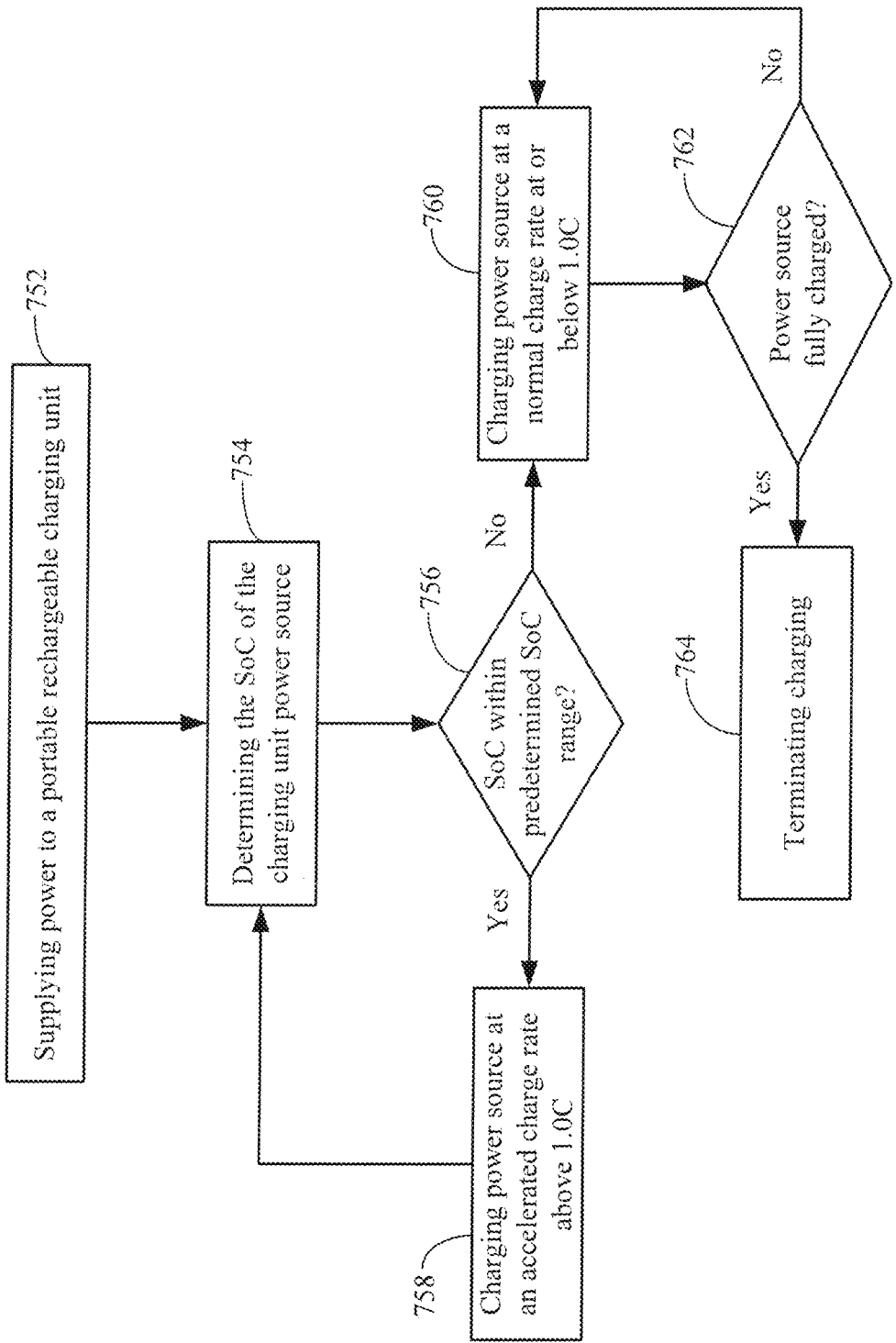
FIG. 7B illustrates a method of implementing accelerated charging of a portable rechargeable charging unit in accordance with various embodiments.

FIG. 7B illustrates a method of implementing accelerated charging of a portable rechargeable charging unit in accordance with various embodiments. The method shown in FIG. 7B involves supplying power to the portable charging unit, such as from a standard wall socket. The method involves determining 754 the SoC of the rechargeable power source of the portable charging unit. A check 756 is made to determine if the SoC of the power source is within a predetermined SoC range (e.g., 5-35%). If the SoC of the power source falls within the predetermined SoC range, the method involves charging 758 the power source of the portable charging unit at an accelerated charge rate above 1.0C (e.g., 1.5C-3.0C). Accelerated charging continues while the SoC of the power source remains within the predetermined SoC range. Accelerated charging is discontinued when the SoC of the power source is beyond the predetermined SoC range. In some embodiments, accelerated charging is discontinued in response to expiration of a predetermined time limit (e.g., 15 minutes), reaching a predetermined voltage limit (e.g., 4.1V), or reaching a predetermined energy limit (e.g., 250 mAh).

At the termination of accelerated charging, the user may disconnect the portable charging unit from the power source for immediate use or transport. Partially charging the power source of the portable charging unit at the accelerated charge rate for about 7 minutes charges the power source for at least about 3 hours of use. For example, after about 7 minutes of accelerated charging, the portable charging unit has enough capacity to supply a full charge to a pair of HADs and, in addition, to perform accelerated charging of the HADs. Rather than using or transporting the portable charging unit after termination of accelerated charging, the method can involve charging 760 the power source at a normal charge rate at or below 1.0 C. A check 762 is made to determine if the power source is fully charged. If not, charging at the normal charge rate continues. When the power source of the portable charging unit is fully charged, the charging procedure is terminated 764.

Figure 8:
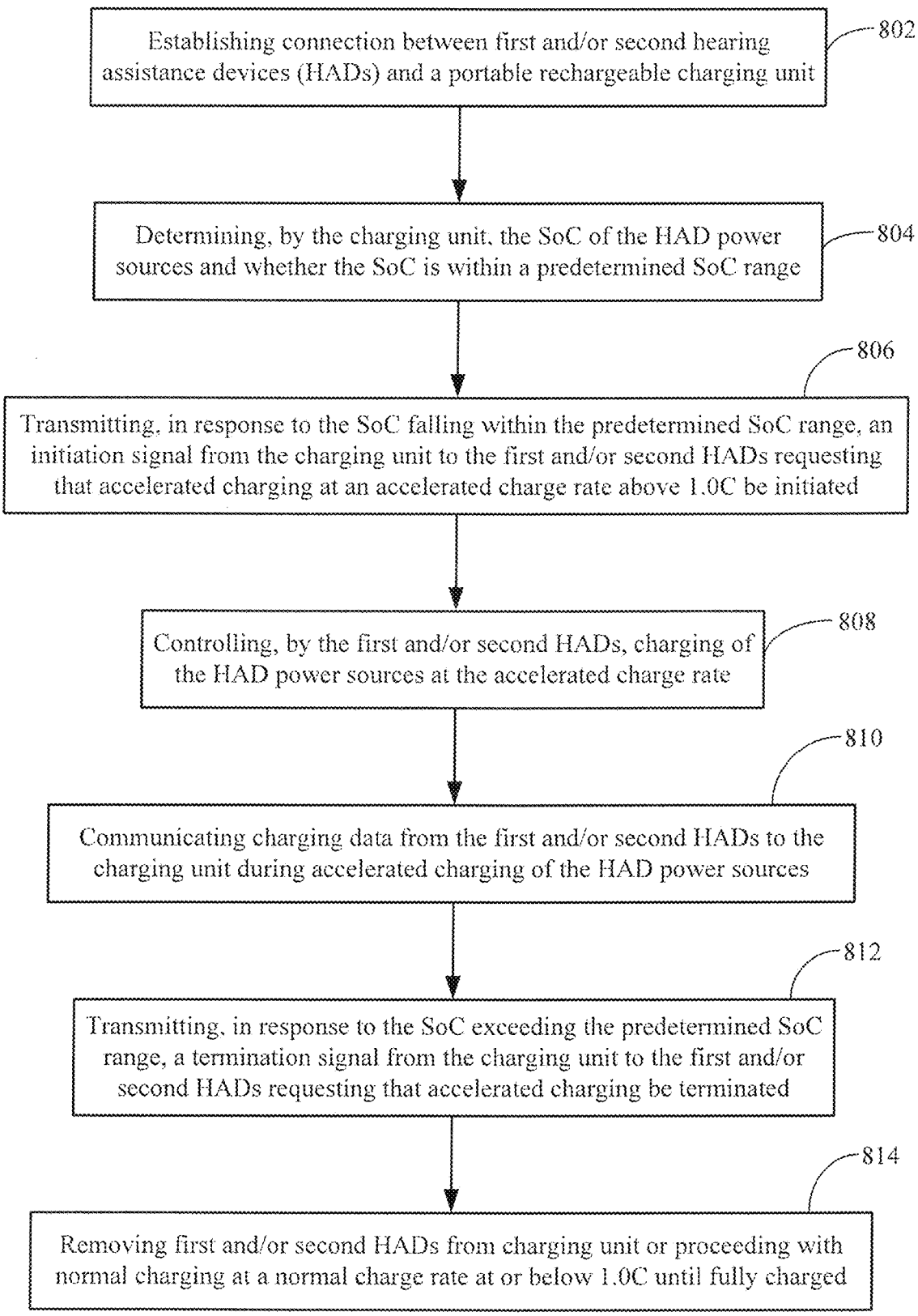
FIG. 8 illustrates a method of implementing accelerated charging of one or a pair of hearing assistance devices in accordance with various embodiments.

FIG. 8 illustrates a method of implementing accelerated charging of one or a pair of hearing assistance devices in accordance with various embodiments. The method shown in FIG. 8 involves establishing connection 802 between first and/or second hearing assistance devices and a portable rechargeable charging unit. The method involves determining 804, by the charging unit, the SoC of the HAD power sources and whether the SoC is within a predetermined SoC range. The method also involves transmitting 806, in response to the SoC falling within the predetermined SoC range, and initiation signal from the charging unit to the first and/or second HADs requesting that accelerated charging at an accelerated charge rate above 1.0C be initiated.

The method involves controlling 808, by the first and/or second HADs, charging of the HAD power sources at the accelerated charge rate. The method further involves communicating 810 charging data from the first and/or second HADs to the charging unit during accelerated charging of the HAD power sources. The method also involves transmitting 812, in response to the SoC exceeding the predetermined SoC range, a termination signal from the charging unit to the first and/or second HADs requesting that accelerated charging be terminated. After termination of accelerated charging, the method involves removing the first and/or second HADs from the charging unit or proceeding with normal charging of the HAD power sources at a normal charge rate at or below 1.0C until fully charged.

Figure 9:
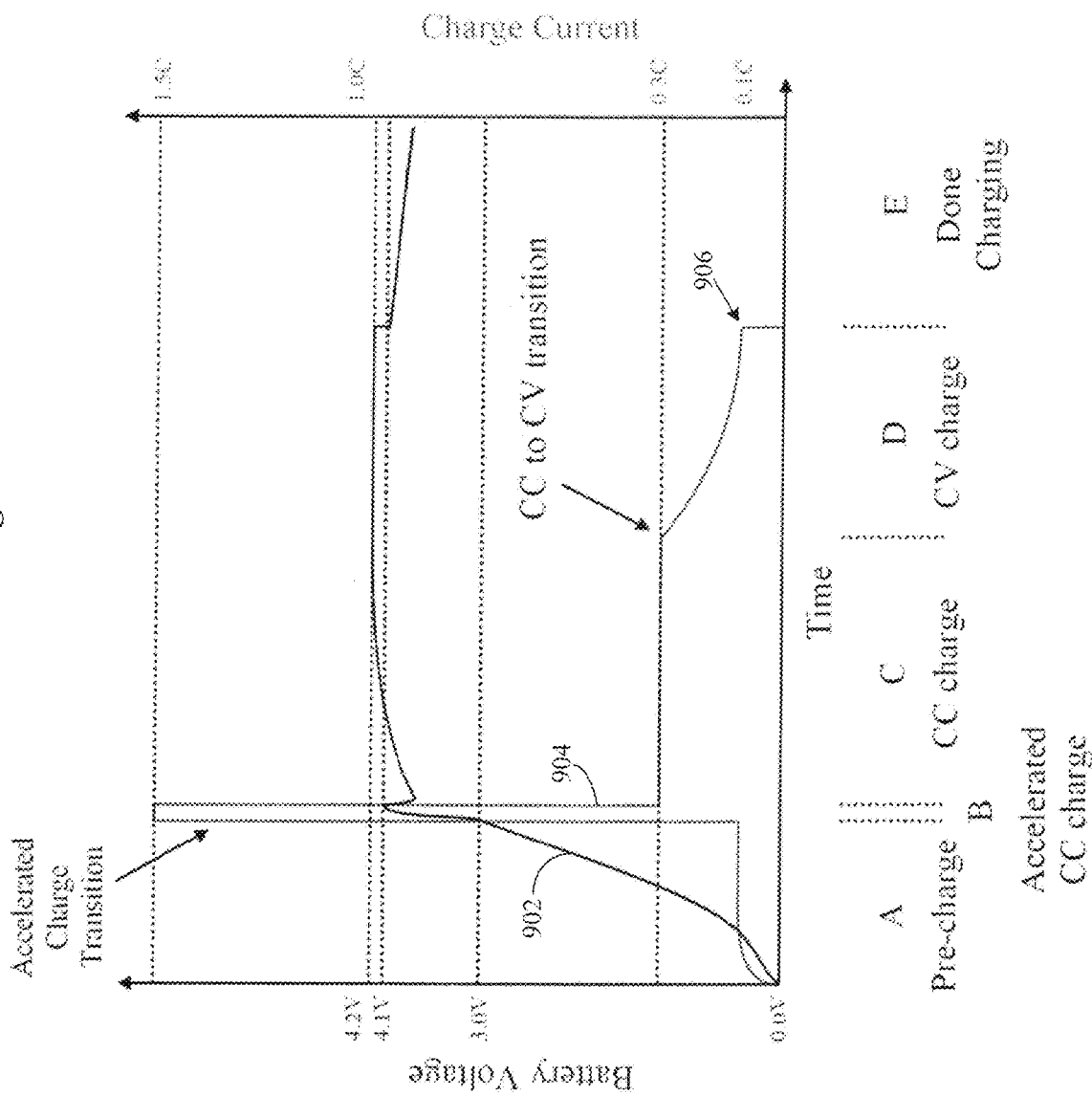
FIG. 9 is a graph that characterizes accelerated charging of a lithium-ion battery in accordance with various embodiments.

FIG. 9 is a graph that characterizes accelerated charging of a lithium-ion battery in accordance with various embodiments. The graph of FIG. 9 characterizes battery voltage 902 and charge current 904 as a function of time during different phases of a charging procedure. As is indicated below the time axis, the different phases of the charging procedure include a pre-charge phase (A), an accelerated constant current charge phase (B), a constant voltage charge phase (D), and a charge complete phase (E). During the pre-charge phase (A), the charge current 904 is low (e.g., 0.1C) and the battery voltage 902 slowly increases. It is noted that a well-designed system should stay out of this regime. The pre-charge phase (A) continues until the battery voltage 902 reaches 3.0 V, at which time the accelerated constant current charge phase (B) is initiated.

During the accelerated charging phase (B), the charge current 904 rapidly increases to a charge rate above 1.0C, such as 1.5C. During the accelerated charging phase (B), high current is supplied to the battery which results in a rapid increase in battery voltage 902. For example, a charge current of 5 mA can be supplied to the battery during the latter part of the pre-charge phase (A) (e.g., at 0.3C). The charge current can be increased to between 17 and 24 mA during the accelerated charging phase (B). The accelerated charging phase (B) continues until a predetermined time limit (e.g., 5-15 min) has been reached. In some embodiments, the accelerated charging phase (B) continues until a predetermined battery voltage 902 (e.g., 4.1 V) or predetermined energy level (e.g., 7.5 mAh) has been reached.

At the conclusion of the accelerated charging phase (B), the charge current 904 rapidly decreases to a normal charge current level (e.g., 5 mA at a charge rate of 0.3C) at the initiation of the constant current charge phase (C). During the constant current charge phase (C), a normal charge current (e.g., 5 mA) is supplied to the battery resulting in a continued increase in the battery voltage 902. When the battery voltage 902 reaches a predetermined level (e.g., 4.2 V), the charging procedure transitions from the constant current charge phase (C) to the constant voltage charge phase (D). During the constant voltage charge phase (D), the charge current 904 decreases until a cutoff 906 is reached, at which time the charging procedure is terminated. It is noted that at the charging complete phase (E), the battery voltage 902 slightly drops over time (e.g., from 4.1 V to 3.9 V).

In the embodiment shown in the FIG. 9, the charge current 904 supplied during the accelerated charging phase (B) changes in a step-wise fashion. It is understood that, in some embodiments, the charge current 904 can decrease gradually as the accelerated charging phase (B) transitions to the constant current charge phase (C).

Figure 10:
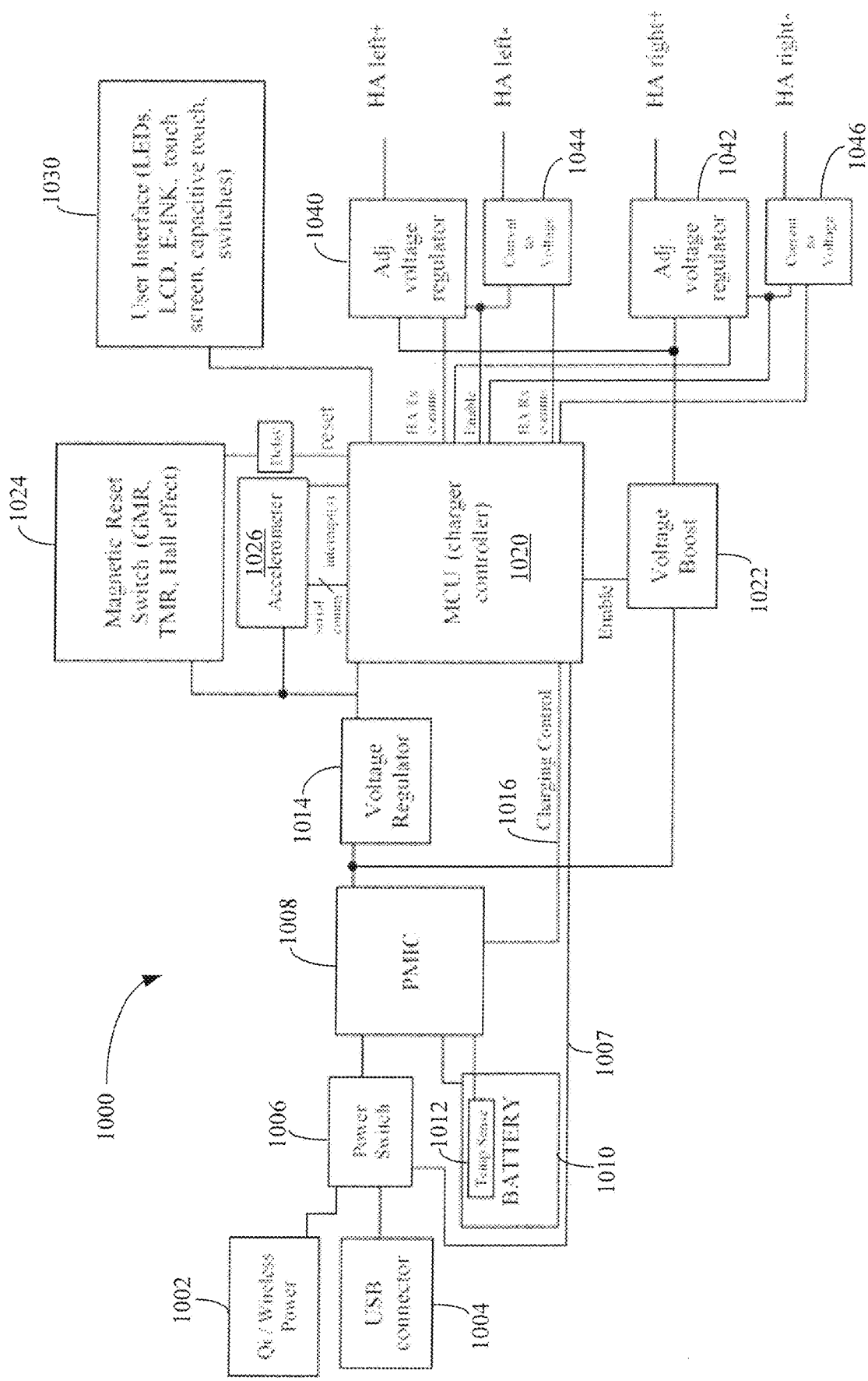
FIG. 10 is a block diagram of a portable rechargeable charging unit in accordance with various embodiments.

Referring now to FIG. 10, there is illustrated a block diagram of a portable rechargeable charging unit 1000 in accordance with various embodiments. The portable charging unit 1000 includes a power switch 1006 which is configured to couple to a hardwired connector 1004 (e.g., USB connector) or a wireless power source 1002 (e.g., a Qi compliant wireless power source). The power switch 1006 includes logic configured to select a power source (1002 or 1004) that provides the most power. The power switch 1006 is coupled to a charger controller (microcontroller unit or MCU) 1020 by control line 1007, and informs the charger controller 1020 which power source has been selected. The power switch 1006 is also coupled to a power management IC (PMIC) 1008. In some embodiments, the PMIC 1008 is a USB-friendly Li-ion battery charger and power-path management IC, such as BQ24079T available from Texas Instruments. The PMIC 1008 is configured to manage charging of the battery 1010 and to supply power to other circuitry via the voltage regulator 1014. The voltage regulator 1014 provides a stable voltage (e.g., 3.3 V) for other components of the portable charging unit 1000. The PMIC 1008 communicates charging status information to the charger controller 1020 via charging control line 1016.

The rechargeable battery 1010 includes a temperature sensor 1012 which is coupled to the PMIC 1008. The PMIC 1008 determines whether charging of the battery 1010 can be initiated based on the temperature of the battery 1010. For example, the PMIC 1008 can initiate charging of the battery 1010 when the battery temperature is within a temperature range of 10 to 50° C. The battery 1010 can have a capacity ranging from 100 mAh to 1000 mAh, such as 580 mAh.

In some embodiments, the charger controller 1020 is coupled to a magnetic reset switch 1024. The magnetic reset switched 1024 can magnetically interact with a magnet arrangement of a hearing assistance device to initiate a system (hardware) rebooting of the device, if needed or desired. The charger controller 1020 is also coupled to an accelerometer 1026 via a serial communication bus and an interrupt line. As was discussed previously, the accelerometer 1026 is responsive to a tap sequence applied by a user to the housing of the portable charging unit 1000. In response to a tap sequence (e.g., single, double, triple tap), the accelerometer 1026 sends a signal to the charger controller 1020 via the interrupt line. For example, a single tap can cause accelerometer 1026 to communicate an accelerated charging request signal to the charger controller 1020. A double tap can cause accelerometer 1026 to communicate an accelerated charging termination signal to the charger controller 1020.

By way of further example, a single tap can cause accelerometer 1026 to communicate a user interface enable signal to the charger controller 1020, causing the user interface 1030 to become active (turn on/illuminate). A double tap can cause accelerometer 1026 to communicate a HAD battery status signal to the charger controller 1020, in which case the charge state of the HAD power sources can be indicated by the user interface 1030. For example, an SoC percentage for each HAD power source can be presented on a display or a colored LED can be illuminated, such as green (good), yellow (fair), or red (poor) indicating different charges states. A triple tap can cause the accelerometer 1026 to communicate a charging unit battery status signal to the charger controller 1020, in which case the charge state of the charging unit battery 1010 is indicated by the user interface 1030. The user interface 1030 can include one or more of LEDs, an OLED display, an LCD, and E-INK display, a touchscreen, capacitive touch switches or other user input device(s).

The charger controller 1020 is also coupled to a voltage boost converter 1022. The charger controller 1020 decides whether or not to enable the voltage boost converter 1022, which provides a higher voltage to the HADs for charging. For example, the voltage boost converter 1022 provides 5.0 V to the adjustable voltage regulators 1040, 1042 of the left and right charge ports when the voltage regulators 1040, 1042 are enabled (via enable lines) for charging by the charger controller 1020. If neither of the HADs are inserted in the charge ports of the portable charging unit 1000, the voltage boost converter 1022 is not enabled by the charger controller 1020. As will be described hereinbelow, the enable lines of the charger controller 1020 can be coupled to touch current mitigation circuitry to prevent the possibility of electrical currents flowing out of the exposed electrical contacts of the charge ports.

The charger controller 1020 communicates with the left and right HADs via a transmit (Tx) communication line and a receive (Rx) communication line provided between the charger controller 1020 and the adjustable voltage regulators 1040, 1042. In general terms, the charger controller 1020 transmits a modulated voltage signal to communicate with the left and right HADs, and the left and right HADs transmit a modulated current signal to communicate with the charger controller 1020. The charger controller 1020 communicates a signal via the Tx communication line causing the adjustable voltage regulators 1040, 1042 to communicate a modulated voltage signal (e.g., a 5 V to 5.2 V square wave) to the left and right HADs. The charger controller 1020 uses the Rx communication line coupled to current-to-voltage circuits 1044, 1046 2 to receive a current signal and any current pulses generated by the left and right HADs. Using the Rx communication line, the charger controller 1020 senses the amount of current the left and right HADs are drawing during charging, and any information signals communicated by the left and right HADs in the form of current pulses.

Figure 11:
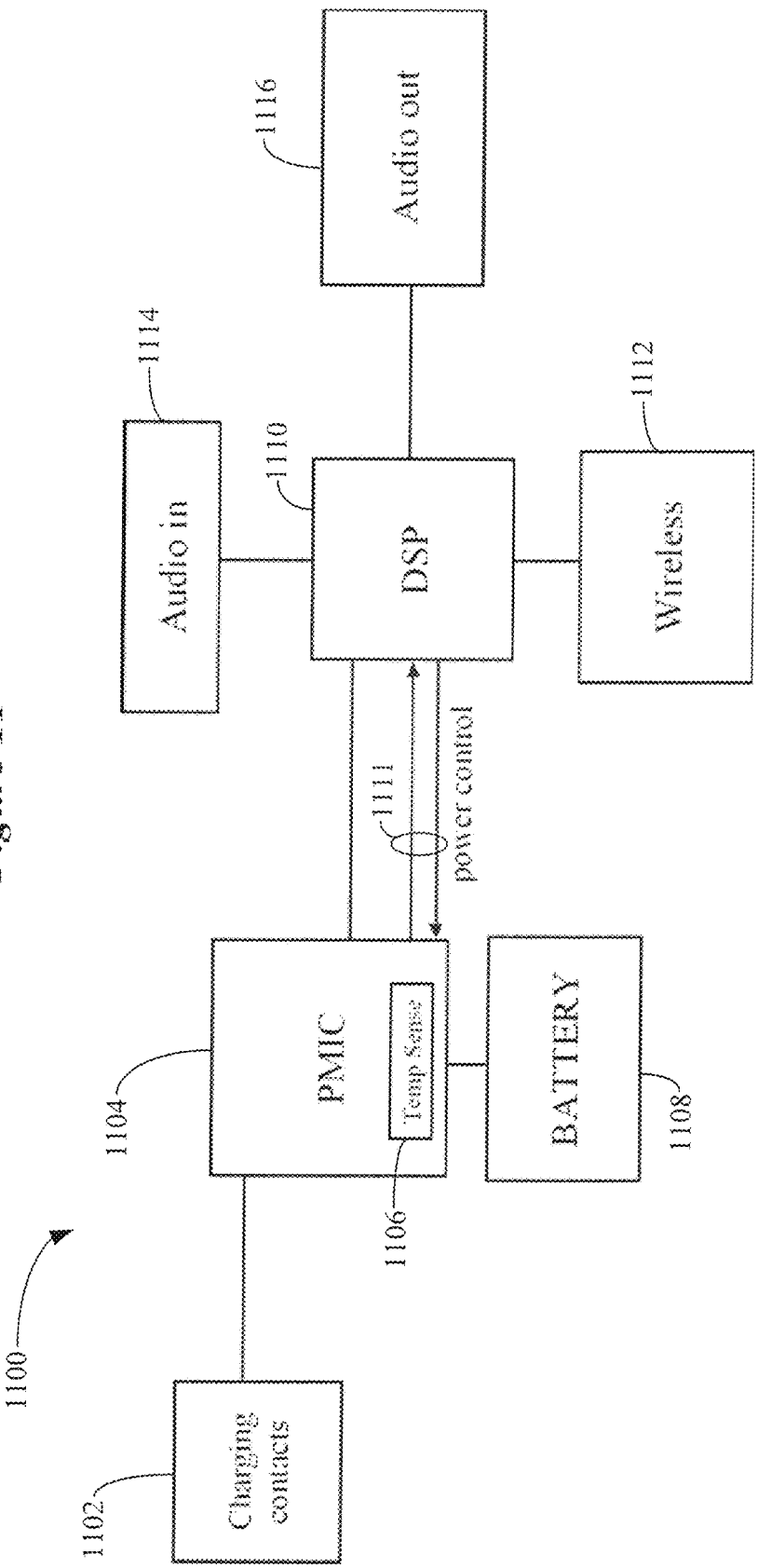
FIG. 11 is a block diagram of a hearing assistance device configured to communicate with the portable charging unit shown in FIG. 10 in accordance with various embodiments.

FIG. 11 is a block diagram of a hearing assistance device 1100 configured to communicate with the portable charging unit 1000 shown in FIG. 10 in accordance with various embodiments. The hearing assistance device 1100 can represent the left or the right HAD. The hearing assistance device 1100 includes a pair of charging contacts 1102 configured to electrically connect with a pair of charging contacts within the charge port of the portable charging unit 1000. The charging contacts 1102 are coupled to a power management IC (PMIC) 1104, which includes a temperature sensor 1106. A suitable PMIC is the HPM10 Power Management IC available from ON Semiconductor. The PMIC 1104 is configured to generate the voltage needed by the HAD 1100 and manages the charging algorithms implemented for charging the battery 1108, including accelerated charging. The PMIC 1104 includes a charger communication interface to inform the portable charging unit 1000 about the charging progress. Various types of battery information, such as voltage levels, current levels, temperature, and different types of battery failures, can also be communicated to the portable charging unit 1000. As was discussed previously, the portable charging unit 1000 communicates with the PMIC 1104 via a modulated voltage signal communicated through the charging contacts 1102. The PMIC 1104 communicates with the portable charging unit 1000 via a modulated current signal transmitted through the charging contacts 1102.

The battery 1108 can be a lithium-ion battery with a capacity ranging from about 15 mAh to 25 mAh. In some larger hearables, the battery 1108 can have a capacity of up to about 100 mAh.

The PMIC 1104 is coupled to a digital signal processor (DSP) 1110. The PMIC 1104 and the DSP 1110 communicate via power control lines 1111. For example, the PMIC 1104 can inform the DSP 1110 when the charge state of the battery 1108 is getting low. The DSP 1110 can inform that PMIC 1104 to power down in response to a switch input from the user. The DSP 1110 is coupled to one or more microphones 1114 (optional), a speaker or receiver 1116, and a wireless communication device 1112 (e.g., a BLE device).

When the HAD 1100 is inserted into a charge port of the portable charging unit 1000, the PMIC 1104 instructs the DSP 1110 to power down during the charging process. The adjustable voltage regulator 1040 or 1042 of the portable charging unit 1000 provides 5.0 V at the charging contacts 1102 of the HAD 1100. The PMIC 1104 controls the different phases of a charging procedure when charging the battery 1108. For example, and with reference to FIG. 9, the PMIC 1104 controls charging of the battery 1108 during the pre-charge phase (A), the accelerated constant current charge phase (B), the constant current charge phase (C), the constant voltage charge phase (D), and the charging complete phase (E). After completion of the charging procedure, and removal of the HAD 1100 from the charge port, the PMIC 1104 instructs the DSP 1110 to power up, since the HAD 1100 is no longer in a charging mode. The PMIC 1104 will remain powered off if charging of the HAD 1100 is complete but the HAD 1100 remains in the charge port.

The following are different charging scenarios for purposes of illustration. After a normal day of use, the left and right HADs 1100 are inserted into the charge ports of the portable charging unit 1000. The PMIC 1008 of the portable charging unit 1000 determines the state of charge of the battery 1108 of the left and right HADs 1100. Since the battery 1108 is not depleted after a normal day of use, accelerated charging is not indicated. As such, the portable charging unit 1000 provides 5.0 V at the charging contacts 1102 of the left and right HADs 1100, and the PMIC 1104 of the left and right HADs 1100 implements normal charging of the battery 1108 (e.g., charging phases C, D, and E). During the charging procedure, the PMIC 1104 reports charging information back to the charger controller 1020 every 2 seconds. For example, the charging information can include the voltage across the battery 1108, the amount of current into the battery 1108, and the amount of energy into the battery 1108.

If, however, the left and right HADs 1100 were heavily used during the day (e.g., long periods of audio streaming), the battery 1108 of the left and right HADs 1100 may be nearly or completely depleted. After inserting the left and right HADs 1100 into the charge ports of the portable charging unit 1000, the charger controller 1020 of the portable charging unit 1000 receives battery status of the left and right HADs 1100 from the PMIC 1104. For example, the battery status information may indicate that the voltage across the battery 1108 is 3.2 V or that the SoC is between 5 and 45%. In response, the charger controller 1020 sends a packet to the PMIC 1104 of the left and right HADs requesting that the PMIC 1104 implement accelerated constant current charging (e.g., charging phase B). For example, the packet can instruct the PMIC 1104 to increase the charge current from 5 mA to 17 or 24 mA (e.g., 1.5-3C). During the accelerated charging phase, the PMIC 1104 reports charging information back to the charger controller 1020 every 2 seconds.

The charger controller 1020 determines when accelerated charging should be terminated, such as by expiration of a predetermined time limit (e.g., 5, 10 or 15 minutes), reaching a predetermined voltage on the battery 1108 (e.g., 4.1V), or reaching a predetermined energy level on the battery 1108 (e.g., 7.5 mAh). The charger controller 1020 sends a packet to the PMIC 1104 of the left and right HADs to reduce the charge current to 5 mA (e.g., at 0.3C) in a constant current mode. After completion of the accelerated charging phase, the left and right HADs 1100 can be removed from the portable charging unit 1000 for immediate use. Alternatively, normal charging of the battery 1108 (e.g., charging phases C, D, and E) can be implemented by the PMIC 1104 until the battery 1108 is fully charged.

According to some embodiments, a portable charging unit can incorporate touch current mitigation circuitry to prevent the possibility of electrical currents flowing out of the exposed electrical contacts of the charge ports. For example, the touch current mitigation circuitry prevents electrical current flow between charge ports when a user places a finger of their left hand in a first charge port and a finger of their right hand in a second charge port. To meet a medical device regulation (e.g., IEC 60601-1-11), for example, the current can never go above 100 µA across a 1 k Ohm load. This means that any exposed electrical contacts with more than 0.1 V will not meet this regulation. Charging batteries via contact charging usually requires much greater voltages.

A charger designed for charging two or more hearing assistance devices includes multiple points of electrical contact between power and ground. For either of the devices, the set of power and ground pins should be designed such that two probes, as per medical regulation IEC 60601-1-11, cannot establish a path between power and ground using both probes. Given the dimensions of the hearing assistance devices charged by the portable charging unit, it may be difficult or impossible to design the electrical contacts such that one probe cannot contact any of the electrical contacts. Touch current mitigation circuitry, such as that illustrated in FIG. 12, prevents currents from flowing through unintended paths between the multiple power and ground electrical contacts.

Figure 12:
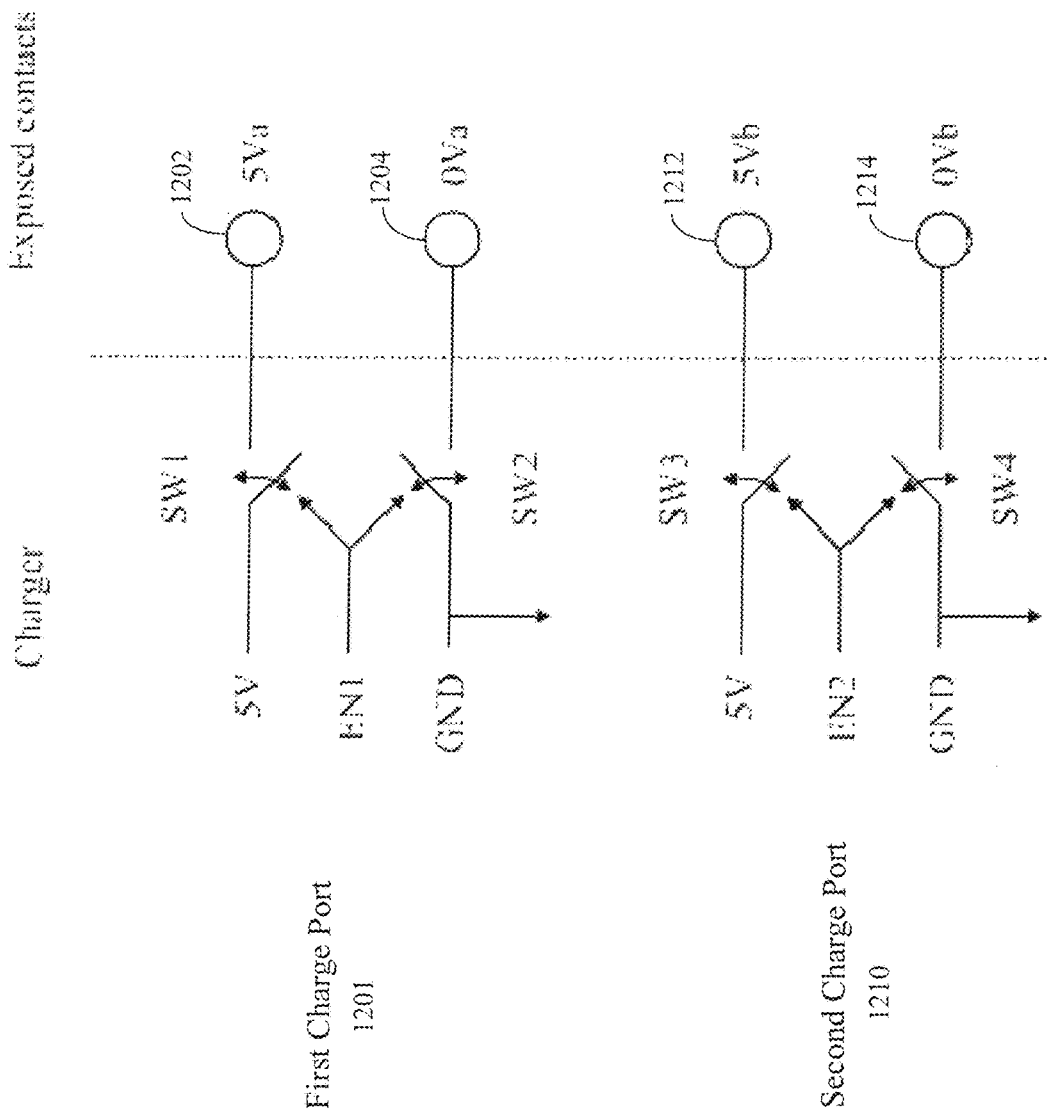
FIG. 12 is a schematic of touch current mitigation circuitry that can be incorporated in a portable charging unit in accordance with various embodiments.

According to various embodiments, the touch current mitigation circuitry shown in FIG. 12 comprises solid state switches on the power and ground electrical contacts. These switches can be simple MOSFETS (PMOS for the power contacts, and NMOS for the ground contacts), bilateral CMOS, programmable load switches, mechanical disconnects such as relays, or other solid state switch technologies. The switch enable lines are connected to a form of logic to only activate the switches when the exposed electrical contacts of the portable charging unit are connected to the electrical contacts of the hearing assistance devices.

FIG. 12 shows a first charge port 1201 and a second charge port 1210 of a portable charging unit. The first charge port 1201 includes a first exposed contact 1202 coupled to a 5 V source via switch SW1, and a second exposed contact 1204 coupled to ground (GND) via switch SW2. The second charge port 1210 includes a first exposed contact 1212 coupled to a 5 V source via switch SW3, and a second exposed contact 1214 coupled to ground via switch SW 4. Switches SW1 and SW2 are controlled by a first enable line EN1, and switches SW3 and SW4 are controlled by a second enable line EN2. The first and second enable lines EN1 and EN2 of FIG. 12 can correspond to first and second enable lines of the charger controller 1020 shown in FIG. 10. As is shown in FIG. 10, the first enable line EN1 enables the adjustable voltage regulator 1040 and the current-to-voltage circuitry 1044. The second enable line EN2 enables the adjustable voltage regulator 1042 and the current-to-voltage circuitry 1046.

When EN1 is activated, switches SW1 and SW2 close and allow current to flow in or out of the exposed electrical contacts 1202 (5Va) or 1204 (0Va). When enable line EN1 is deactivated, switches SW1 and SW2 are opened and no current can flow into or out of either contact 1202 or 1204. When enable line EN2 is activated, switches SW3 and SW4 close and allow current to flow in or out of the exposed electrical contacts 1212 (5Vb) or 1214 (0Vb). When enable line EN2 is deactivated, switches SW3 and SW4 are opened and no current can flow into or out of either contact 1212 or 1214. This arrangement allows for four possible states given in Table 1 below.

TABLE 1

| EN1 | EN2 | Current allowed | | | |
| --- | --- | --- | --- | --- | --- |
| | | 5Va | 0Va | 5Vb | 0Vb |
| Deactive | Deactive | | | | |
| Active | Deactive | • | • | | |
| Deactive | Active | | | • | • |
| Active | Active | • | • | • | • |

It is noted that Table 1 above can be extended to N number of contacts. With N contacts, there will be two switches per contact as in FIG. 12, making for 2N switches in the system. This will mean 2N states where each state is a unique combination of switch states.

In order for the system to know when it is possible to enable current flow, the following steps are provided as an example sequence. First, both enable lines EN1 and EN2 start in a deactivated state. Second, only EN1 is initially activated to allow current to flow. This will charge the HAD and provide a signal that the charger controller 1020 monitors to detect whether the HAD is present using a characteristic current or communication on the line. For example, the charger controller 1020 can look for a characteristic current profile that is present when a HAD is connected to a charge port. This process should take less than 1/N the period required to check N contacts to prevent user exposure. This rate is guided by human reaction time to provide a desirable user experience. Third, if the logic implemented by the charger controller 1020 does not find an intended HAD, it will deactivate the activated circuit (e.g., EN1) and activate the other circuit (e.g., EN2) after the contacts controlled by EN1 are de-energized. A delay can be used to insure the switches SW1 and SW2 are fully de-energized before activating EN2. Fourth, the logic implemented by the charger controller 1020 will then do the same analysis to decide if an intended HAD is connected to the exposed electrical contacts controlled by EN2. If the logic does not find a HAD, it will deactivate the active circuit (e.g., EN2) and optionally sleep before repeating the process. By allowing the electrical circuits to enter a sleep state for a small delay (e.g., 100 ms), the circuit can reduce current consumption by trading off time to detect a HAD after placement (e.g., 100 ms+time required to detect a HAD). Fifth, the logic implemented by the charger controller 1020 will then do the same analysis to decide if an intended HAD is connected to the exposed electrical contacts controlled by EN3 and so on according to the total number of contacts N. Once a HAD is detected, the charger controller 1020 will continually check for the signal evidencing that the HAD is present. If this signal is not detected, the associated charging contacts are disabled as soon as possible to prevent a state where the contacts may be exposed once more.

It is noted that a conventional approach to mitigating touch current involves recessing the contact pins such that it is mechanically impossible to touch the contact pins. Other conventional approaches include a cover with some form of switch that disconnects the pins either electrically or mechanically when the cover is open. Recessing contact pins introduces a risk of material clogging up the recessed hole and not allowing the electrical connection to connect. For a very low profile design, a cover is not ideal, and the added circuitry and mechanical parts for a switch increase the cost. When a switch is used to charge only when the cover is closed, this prevents the device from charging while open.

The touch current mitigation circuitry illustrated in FIG. 12 allows for any mechanical design with no limitations for the charging contacts in a medical setting. The touch current mitigation circuitry uses a small number of small solid state switches which can be very inexpensive and minimally increase the size of the circuitry. When the touch current mitigation circuitry looks for a signal proving the presence of an acceptable HAD to charge, the circuitry verifies that a proper HAD has been inserted before continuing to apply power. The touch current mitigation circuitry provides for a coverless charger design and removes any circuitry from detecting a closed cover. This results in saving power, as the circuitry can duty cycle the charging contacts to detect a proper device. When an improper device is detected, power is saved by terminating current flow.

Figures 13A, 13B:
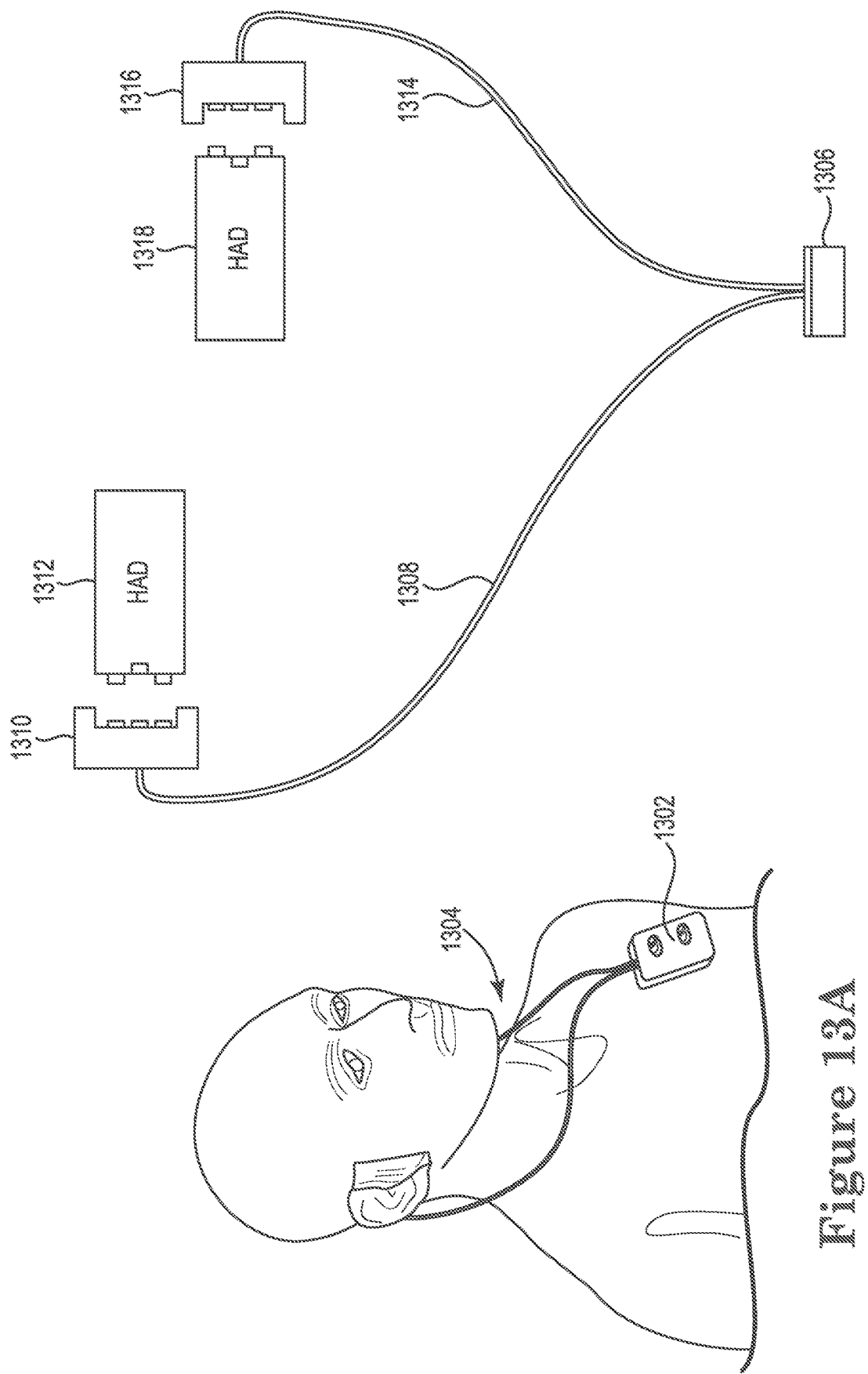
FIGS. 13A and 13B illustrate a tether cable arrangement connected between a portable rechargeable charging unit and a pair of hearing assistance devices in accordance with various embodiments.

FIGS. 13A and 13B illustrate a tether cable arrangement 1304 between a portable rechargeable charging unit 1302 and a pair of hearing assistance devices 1312, 1318 in accordance with various embodiments. In some embodiments, the tether cable arrangement 1304 facilitates concurrent powering and charging of the HADs 1312, 1318 when the HADs 1312, 1318 run out of power during daily use. In other embodiments, the tether cable arrangement 1304 facilitates powering, but not charging, of the HADs 1312, 1318.

The tether cable arrangement 1304 includes a charging unit connector 1306 configured to electrically coupled to the interface of the portable charging unit 1302 (see, e.g., interface 620 in FIG. 6A). The charging unit connector 1306 is electrically connected to a first cable 1304 and a second cable 1314. A first HAD connector 1310 is connected at the end of the first cable 1304, and a second HAD connector 1316 is connected at the end of the second cable 1314. The first and second HAD connectors 1310, 1316 are configured in a manner similar to the charge ports of the portable charge unit 1302.

The first HAD connector 1310 includes a pair of electrical contacts that establish a connection with a corresponding pair of electrical contacts of a first HAD 1312. The first HAD connector 1310 includes a magnet that magnetically interacts with a magnet or ferrous material of the first HAD 1312, which serves to maintain mating engagement between the first HAD connector 1310 and the first HAD 1312 during use. The second HAD connector 1316 includes a pair of electrical contacts that establish a connection with a corresponding pair of electrical contact of a second HAD 1318. The second HAD connector 1316 includes a magnet that magnetically interacts with a magnet or ferrous material of the second HAD 1318, which serves to maintain mating engagement between the second HAD connector 1316 and the second HAD 1318 during use.

Advantageously, the first and second HADs 1312, 1318 remain active and can be used while the tether cable connection facilitates charging of the power sources of the first and second HADs 1312, 1318. According to some embodiments, after 15 minutes of powering/charging via the tether cable arrangement, the power sources of the first and second HADs 1312, 1318 have over 2½ hours of capacity. After one hour of tethered powering/charging, the power sources of the first and second HADs 1312, 1318 have greater than 10 hours of capacity. Accelerated charging is available using the tether cable arrangement, but typically at a lower charge rate (e.g., 1.5C-2.0C).

In other embodiments, the HADs 1312, 1318 may be of a size too small to contain a rechargeable battery. Instead, the HADs 1312, 1318 may include a small non-rechargeable battery. In such embodiments, the portable charging unit 1302 can be attached to the HADs 1312, 1318 via the tether cable arrangement 1304 to supply power to the HADs 1312, 1318 without depleting the non-rechargeable battery. For example, the portable charging unit 1302 can supply power needed to stream audio through the HADs 1312, 1318 (e.g., while watching a movie) without drawing power from the non-rechargeable battery.

According to some embodiments, the portable charging unit can cooperate with a pair of hearing assistance devices to provide a portable microphone capability. Referring again to FIG. 6A, the user interface 626 of the portable charging unit 600 can be used to actuate a portable microphone function of the portable charging unit 600. For example, a sequence of 4 taps to the housing of the portable charging unit 600 can be detected by the accelerometer 625, which in turn activates the portable microphone function. The user places one of the HADs (e.g., HAD 640) in a charge port (e.g., charge port 602), while the other HAD (e.g., HAD 650) is worn by the user. When connected, the portable charging unit 600 instructs HAD 640 to turn off its speaker/receiver, while leaving the microphone and wireless communication device active. The active microphone and wireless communication device of HAD 640 allows for transmission of audio proximate the portable charging unit 600 to be communicated to the still worn HAD 650. The portable charging unit 600 can be moved to any desired location, allowing the wearer to receive audio from such location. The portable microphone function can be terminated by an appropriate user input to the user interface 626 (e.g., a double tap to the housing of the portable charging unit 600).

In other embodiments, the portable charging unit 600 includes a microphone 627 and a wireless communication device 621 (e.g., a BLE device) which provide a portable microphone capability. With reference again to FIG. 6A, a microphone 627 can be mounted on the housing of the portable charging unit 600. A tap sequence (e.g., 4 taps) can be applied to the housing of the portable charging unit 600 and detected by the accelerometer 625, which activates the portable microphone function using the microphone 627. In this embodiment, the user need not remove one of the HADs 640, 650 to implement the portable microphone function. The microphone 627, communication device 621, and wireless communication devices of the HADs 640, 650 cooperate to transmit audio received by the microphone 627 to the HADs 640, 650.

This document discloses numerous embodiments, including but not limited to the following:

Item 1 is an apparatus, comprising:

first and second hearing assistance devices each comprising a rechargeable power source and power management circuitry configured to control charging of the power sources; and a portable charging unit comprising:

an interface configured to receive a connector of a power cable or a power and data cable;

a rechargeable power source coupled to the interface;

first and second charge ports configured to receive the first and second hearing assistance devices, and charging circuitry coupled to the first and second charge ports and to the rechargeable power source of the charging unit;

wherein the power management circuitry and the charging circuitry cooperate to partially charge the power sources of the hearing assistance devices at an accelerated charge rate above 1.0C when a state of charge (SoC) of the power sources is within a predetermined SoC range.

Item 2 is the apparatus of item 1, wherein the power management circuitry and the charging circuitry cooperate to fully charge the power sources of the hearing assistance devices at a charge rate at or below 1.0C when the SoC of the power sources exceeds the predetermined SoC range.

Item 3 is the apparatus of item 1, wherein the predetermined SoC range is a range from a fully discharged state to about 45%.

Item 4 is the apparatus of item 1, wherein the accelerated charge rate is a rate from about 1.5C to about 3C.

Item 5 is the apparatus of item 1, wherein:

the power management circuitry and the charging circuitry cooperate to charge the power sources of the hearing assistance devices at the accelerated charge rate and at a normal charge rate at or below 1.0C; and a charging current associated with the accelerated charge rate is greater than a charging current associated with the normal charge rate by a factor in a range from about 3 to 10.

Item 6 is the apparatus of item 1, wherein:

the charging circuitry is configured to transmit a signal to the power management circuitry via the first and second charge ports indicating that charging at the accelerated charge rate is indicated; and the power management circuitry is configured to transmit a signal to the charging circuitry via the first and second charge ports indicating that charging at the accelerated charge rate can be initiated.

Item 7 is the apparatus of item 1, wherein charging at the accelerated charge rate is terminated in response to one or more of reaching a predetermined time limit, reaching a predetermined voltage limit, or reaching a predetermined energy limit.

Item 8 is the apparatus of item 1, comprising a tether cable arrangement coupled between the interface of the portable charging unit and each of the first and second hearing assistance devices, the tether cable arrangement configured to facilitate concurrent charging of the power sources and powering of the first and second hearing assistance devices.

Item 9 is the apparatus of item 1, wherein the charging circuitry comprises switching circuitry coupled to the first and second charging ports, the switching circuitry configured to:

alternately energize the first and second charging ports;

in response to detecting a signal indicating presence of the first hearing assistance device in the first energized charging port, continue to energize the first energized charging port and energize the second charging port;

in response to detecting a signal indicating presence of the second hearing assistance device in the second energized charging port, continue to energize the second energized charging port; and de-energize the first and second charging ports in response to detecting an absence of a signal indicating presence of the first and second hearing assistance devices in the first and second charging ports.

Item 10 is the apparatus of item 1, wherein the portable charging unit is configured to implement a portable microphone function by which a microphone and a communication device of one of the first and second hearing assistance devices installed in a charge port transmits audio to the other of the first and second hearing assistance devices worn by a user.

Item 11 is the apparatus of item 1, comprising a portable remote control configured to wirelessly communicate with and control functions of the first and second hearing assistance devices, the remote control comprising electrical contacts configured to be received by the first and second charge ports of the portable charging unit, the portable remote control drawing power from the portable charging unit.

Item 12 is the apparatus of item 1, comprising a portable power accessory including a solar cell, the power accessory comprising electrical contacts configured to be received by the first and second charge ports of the portable charging unit, the power accessory configured to supply power for recharging the power source of the portable charging unit.

Item 13 is the apparatus of item 1, comprising a portable physiologic sensor accessory, the physiologic sensor accessory comprising electrical contacts configured to be received by the first and second charge ports of the portable charging unit, the physiologic sensor accessory comprising one or more of an EKG or ECG sensor, an EEG sensor, an EOG sensor, an EMG sensor, a blood glucose sensor, a galvanic skin response sensor, a pulse oximetry sensor, a respiration sensor and a temperature sensor.

Item 14 is an apparatus, comprising:

first and second hearing assistance devices each comprising a rechargeable power source and power management circuitry configured to control charging of the power sources; and a portable charging unit (PCU) comprising:
an interface configured to receive a connector of a power cable or a power and data cable;
a rechargeable PCU power source coupled to the interface;
first and second charge ports configured to receive the first and second hearing assistance devices, and
charging circuitry coupled to the first and second charge ports and to the PCU power source;

wherein:
the power management circuitry and the charging circuitry cooperate to partially charge the power sources of the hearing assistance devices at an accelerated charge rate above 1.0C when a state of charge (SoC) of the power sources is within a predetermined SoC range; and
the charging circuitry is configured to partially charge the PCU power source at an accelerated charge rate above 1.0C when a state of charge (SoC) of the PCU power source of the portable charging unit is within a predetermined SoC range.

Item 15 is the apparatus of item 14, wherein the predetermined SoC range is a range from a fully discharged state to about 45%.

Item 16 is the apparatus of item 14, wherein the accelerated charge rate is a rate from about 1.5C to about 3C.

Item 17 is a method of charging rechargeable power sources of first and second hearing assistance devices using a portable rechargeable charging unit, the method comprising:

establishing electrical connections between the first and second hearing assistance devices (HADs) and the portable charging unit (PCU);

determining the state of charge (SoC) of the HAD power sources;

charging the HAD power sources at an accelerated charge rate above 1.0C in response to the SoC falling within a predetermined SoC range; and charging the HAD power sources at a normal charge rate at or below 1.0C in response to the SoC exceeding the predetermined SoC range.

Item 18 is the method of item 17, comprising:
determining, by the charging unit, the SoC of the HAD power sources and whether the SoC is within the predetermined SoC range;

transmitting, in response to the SoC falling within the predetermined SoC range, an initiation signal from the charging unit to the first and second hearing assistance devices requesting that accelerated charging at the accelerated charge rate above 1.0C be initiated;

controlling, by the first and second hearing assistance devices, charging of the HAD power sources at the accelerated charge rate;

communicating charging data from the first and second hearing assistance devices to the charging unit during charging of the HAD power sources; and transmitting, in response to the SoC exceeding the predetermined SoC range, a termination signal from the charging unit to the first and second hearing assistance devices requesting that accelerated charging be terminated.

Item 19 is the method of item 17, comprising:
supplying power to a rechargeable power source of the portable charging unit;
determining a SoC of the PCU power source;

charging the PCU power source at an accelerated charge rate above 1.0C in response to the SoC falling within a predetermined SoC range; and charging the PCU power source at a normal charge rate at or below 1.0C in response to the SoC exceeding the predetermined SoC range.

Item 20 is the method of item 17, wherein the predetermined SoC range is a range from a fully discharged state to about 45%.

Item 21 is the method of item 17, wherein the accelerated charge rate is a rate from about 1.5C to about 3C.

Item 22 is the method of item 17, wherein charging at the accelerated charge rate is terminated in response to one or more of reaching a predetermined time limit, reaching a predetermined voltage limit, or reaching a predetermined energy limit.

Although the subject matter has been described in language specific to structural features and/or methodological acts, it is to be understood that the subject matter defined in the appended claims is not necessarily limited to the specific features or acts described above. Rather, the specific features and acts described above are disclosed as representative forms of implementing the claims.

What is claimed is:

1. An apparatus, comprising:
    first and second hearing assistance devices each comprising a rechargeable lithium-ion power source and power management circuitry configured to control charging of the power sources; and
    a portable charging unit comprising:
        an interface configured to receive a connector of a power cable or a power and data cable;
        a rechargeable lithium-ion power source coupled to the interface;
        first and second charge ports configured to receive the first and second hearing assistance devices, and
        charging circuitry coupled to the first and second charge ports and to the rechargeable power source of the charging unit;
    wherein the power management circuitry and the charging circuitry cooperate to partially charge the power sources of the hearing assistance devices at an accelerated charge rate above 1.0C when a state of charge (SoC) of the power sources is within a predetermined SoC range, and the predetermined SoC range is a range from a fully discharged state to about 45%.

2. The apparatus of claim 1, wherein the power management circuitry and the charging circuitry cooperate to fully charge the power sources of the hearing assistance devices at a charge rate at or below 1.0C when the SoC of the power sources exceeds the predetermined SoC range.

3. The apparatus of claim 1, wherein the predetermined SoC range is a range from 5% to about 45%.

4. The apparatus of claim 1, wherein the accelerated charge rate is a rate from about 1.5C to about 3C.

5. The apparatus of claim 1, wherein:
    the power management circuitry and the charging circuitry cooperate to charge the power sources of the hearing assistance devices at the accelerated charge rate and at a normal charge rate at or below 1.0C; and
    a charging current associated with the accelerated charge rate is greater than a charging current associated with the normal charge rate by a factor in a range from about 3 to 10.

6. The apparatus of claim 1, wherein:
    the charging circuitry is configured to transmit a signal to the power management circuitry via the first and second charge ports indicating that charging at the accelerated charge rate is indicated; and
    the power management circuitry is configured to transmit a signal to the charging circuitry via the first and second charge ports indicating that charging at the accelerated charge rate can be initiated.

7. The apparatus of claim 1, wherein charging at the accelerated charge rate is terminated in response to one or more of reaching a predetermined time limit, reaching a predetermined voltage limit, or reaching a predetermined energy limit.

8. The apparatus of claim 1, comprising a tether cable arrangement coupled between the interface of the portable charging unit and each of the first and second hearing assistance devices, the tether cable arrangement configured to facilitate concurrent charging of the power sources and powering of the first and second hearing assistance devices.

9. The apparatus of claim 1, wherein the charging circuitry comprises switching circuitry coupled to the first and second charging ports, the switching circuitry configured to:
    alternately energize the first and second charging ports;
    in response to detecting a signal indicating presence of the first hearing assistance device in the first energized charging port, continue to energize the first energized charging port and energize the second charging port;
    in response to detecting a signal indicating presence of the second hearing assistance device in the second energized charging port, continue to energize the second energized charging port; and
    de-energize the first and second charging ports in response to detecting an absence of a signal indicating presence of the first and second hearing assistance devices in the first and second charging ports.

10. The apparatus of claim 1, wherein the portable charging unit is configured to implement a portable microphone function by which a microphone and a communication device of one of the first and second hearing assistance devices installed in a charge port transmits audio to the other of the first and second hearing assistance devices worn by a user.

11. The apparatus of claim 1, comprising a portable remote control configured to wirelessly communicate with and control functions of the first and second hearing assistance devices, the remote control comprising electrical contacts configured to be received by the first and second charge ports of the portable charging unit, the portable remote control drawing power from the portable charging unit.

12. The apparatus of claim 1, comprising a portable power accessory including a solar cell, the power accessory comprising electrical contacts configured to be received by the first and second charge ports of the portable charging unit, the power accessory configured to supply power for recharging the power source of the portable charging unit.

13. The apparatus of claim 1, comprising a portable physiologic sensor accessory, the physiologic sensor accessory comprising electrical contacts configured to be received by the first and second charge ports of the portable charging unit, the physiologic sensor accessory comprising one or more of an EKG or ECG sensor, an EEG sensor, an EOG sensor, an EMG sensor, a blood glucose sensor, a galvanic skin response sensor, a pulse oximetry sensor, a respiration sensor and a temperature sensor.

14. An apparatus, comprising:
    first and second hearing assistance devices each comprising a rechargeable lithium-ion power source and power management circuitry configured to control charging of the power sources; and a portable charging unit (PCU) comprising:
  an interface configured to receive a connector of a power cable or a power and data cable;
  a rechargeable lithium-ion PCU power source coupled to the interface;
  first and second charge ports configured to receive the first and second hearing assistance devices, and
  charging circuitry coupled to the first and second charge ports and to the PCU power source;
wherein:
  the power management circuitry and the charging circuitry cooperate to partially charge the power sources of the hearing assistance devices at an accelerated charge rate above 1.0C when a state of charge (SoC) of the power sources is within a predetermined SoC range;
  the charging circuitry is configured to partially charge the PCU power source at an accelerated charge rate above 1.0C when a SoC of the PCU power source is within the predetermined SoC range; and
  the predetermined SoC range is a range from a fully discharged state to about 45%.

15. The apparatus of claim 14, wherein the predetermined SoC range is a range from 5% to about 45%.

16. The apparatus of claim 14, wherein the accelerated charge rate is a rate from about 1.5C to about 3C.

17. A method of charging rechargeable lithium-ion power sources of first and second hearing assistance devices using a portable rechargeable charging unit comprising a rechargeable lithium-ion power source, the method comprising:
  establishing electrical connections between the first and second hearing assistance devices (HADs) and the portable charging unit (PCU);
  determining the state of charge (SoC) of the HAD power sources;
  charging the HAD power sources at an accelerated charge rate above 1.0C in response to the SoC falling within a predetermined SoC range; and
  charging the HAD power sources at a normal charge rate at or below 1.0C in response to the SoC exceeding the predetermined SoC range;

wherein the predetermined SoC range is a range from a fully discharged state to about 45%.

18. The method of claim 17, comprising:
  determining, by the charging unit, the SoC of the HAD power sources and whether the SoC is within the predetermined SoC range;
  transmitting, in response to the SoC falling within the predetermined SoC range, an initiation signal from the charging unit to the first and second hearing assistance devices requesting that accelerated charging at the accelerated charge rate above 1.0C be initiated;
  controlling, by the first and second hearing assistance devices, charging of the HAD power sources at the accelerated charge rate;
  communicating charging data from the first and second hearing assistance devices to the charging unit during charging of the HAD power sources; and
  transmitting, in response to the SoC exceeding the predetermined SoC range, a termination signal from the charging unit to the first and second hearing assistance devices requesting that accelerated charging be terminated.

19. The method of claim 17, comprising:
  supplying power to the rechargeable power source of the portable charging unit;
  determining a SoC of the PCU power source;
  charging the PCU power source at an accelerated charge rate above 1.0C in response to the SoC falling within a predetermined SoC range; and
  charging the PCU power source at a normal charge rate at or below 1.0C in response to the SoC exceeding the predetermined SoC range.

20. The method of claim 17, wherein the predetermined SoC range is a range from 5% to about 45%.

21. The method of claim 17, wherein the accelerated charge rate is a rate from about 1.5C to about 3C.

22. The method of claim 17, wherein charging at the accelerated charge rate is terminated in response to one or more of reaching a predetermined time limit, reaching a predetermined voltage limit, or reaching a predetermined energy limit.

* * * * *